US009933625B2

(12) United States Patent
Tazbaz et al.

(10) Patent No.: US 9,933,625 B2
(45) Date of Patent: *Apr. 3, 2018

(54) AUGMENTED REALITY SYSTEM EYE RELIEF ADJUSTMENT MECHANISM

(71) Applicant: Microsoft Technology Licensing, LLC, Redmond, WA (US)

(72) Inventors: Errol Mark Tazbaz, Bellevue, WA (US); Roy Joseph Riccomini, Saratoga, CA (US); Andrew Bert Hodge, Palo Alto, CA (US); Bradley William Steiner, San Francisco, CA (US); Michael James Basha, San Francisco, CA (US); Azhar K. Meyer, Berkeley, CA (US); Zoltan Laszlo, San Francisco, CA (US); Christopher Bramley Fruhauf, San Anselmo, CA (US); Perry Q. Anderson, Kensington, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,907

(22) Filed: Jan. 30, 2017

(65) Prior Publication Data
US 2017/0139215 A1    May 18, 2017

Related U.S. Application Data

(63) Continuation of application No. 14/268,552, filed on May 2, 2014, now Pat. No. 9,557,569.

(51) Int. Cl.
*G02B 27/14* (2006.01)
*G02B 27/01* (2006.01)

(52) U.S. Cl.
CPC ..... *G02B 27/0176* (2013.01); *G02B 27/0179* (2013.01); *G02B 2027/0159* (2013.01)

(58) Field of Classification Search
CPC .................................................. G02B 27/017
(Continued)

(56) References Cited

U.S. PATENT DOCUMENTS 5,486,841 A    1/1996 Hara et al.
5,844,530 A    12/1998 Tosaki
(Continued)

FOREIGN PATENT DOCUMENTS

EP    0344881 A2    12/1989
WO    9524713 A1    9/1995

OTHER PUBLICATIONS

Boutette, L. et al., "Helicopter Maritime Environment Trainer: Maintenance Manual", Technical Memorandum of efence Research and Development Canada, Jun. 2011, 118 pages.
(Continued)

*Primary Examiner* — James Jones
(74) *Attorney, Agent, or Firm* — Alleman Hall Creasman & Tuttle LLP

(57) ABSTRACT

A head mounted display (HMD) may comprise an adjustable crown band, a crown band circumference adjusting mechanism coupled to the adjustable crown band and configured to adjust a crown band circumference to releasably secure the crown band to the user's crown, an armature including left and right arms, each of the left and right arms mounted at a respective proximal end to corresponding left and right HMD attachment structures, a display mounted at left and right sides to respective distal ends of the left and right arms, and an eye relief distance adjustment mechanism configured to move the left and right arms in a timed manner toward and away from the crown band along a substantially linear path,
(Continued)

to thereby adjust an eye relief distance from the display to an eye of a the user when the crown band is fitted on the crown of the user.

20 Claims, 30 Drawing Sheets

(58) Field of Classification Search
USPC .......................................................... 359/630
See application file for complete search history.

(56) References Cited

U.S. PATENT DOCUMENTS

| | | | |
|---|---|---|---|
| 6,369,952 B1* | 4/2002 | Rallison | G02B 27/017 359/630 |
| 6,747,611 B1 | 6/2004 | Budd et al. | |
| 7,735,159 B2 | 6/2010 | Prendergast | |
| 8,355,208 B1 | 1/2013 | Baker et al. | |
| 9,557,569 B2* | 1/2017 | Tazbaz | G02B 27/0179 |
| 2009/0243965 A1 | 10/2009 | Price et al. | |
| 2010/0254017 A1 | 10/2010 | Martins | |
| 2013/0188080 A1 | 7/2013 | Olsson et al. | |

OTHER PUBLICATIONS

ISA European Patent Office, International Search Report and Written Opinion Issued in PCT Application No. PCT/US2015/028105, dated Jul. 20, 2015, WIPO, 13 pages.
United States Patent and Trademark Office, Non-final Office Action issued in U.S. Appl. No. 14/268,552, dated Sep. 22, 2015, 7 pages.
United States Patent and Trademark Office, Final Office Action issued in U.S. Appl. No. 14/268,552, Feb. 18, 2016, 6 pages.
United States Patent and Trademark Office, Non-final Office Action issued in U.S. Appl. No. 14/268,552, dated Jun. 1, 2016, 7 pages.
United States Patent and Trademark Office, Notice of Allowance issued in U.S. Appl. No. 14/268,552, dated Sep. 26, 2016, 8 pages.

* cited by examiner

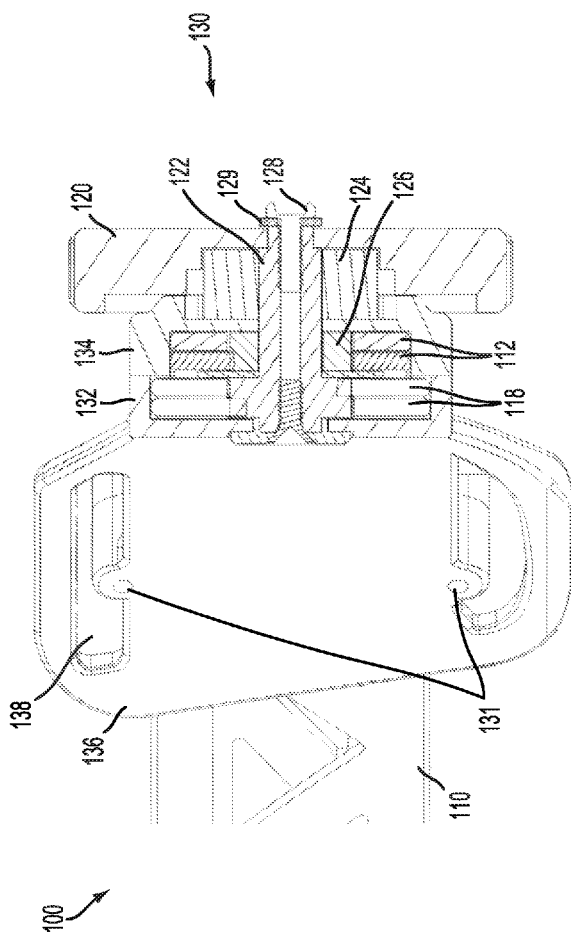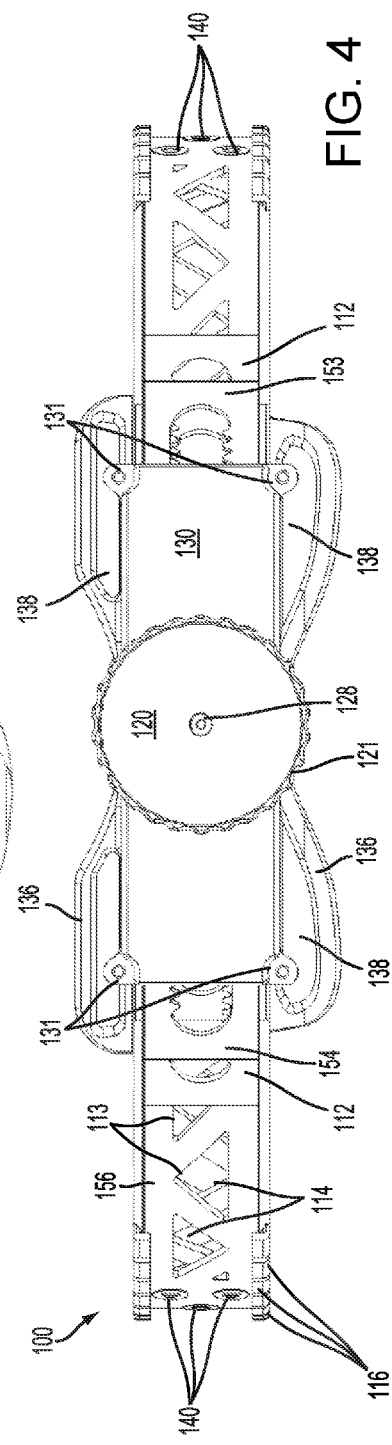

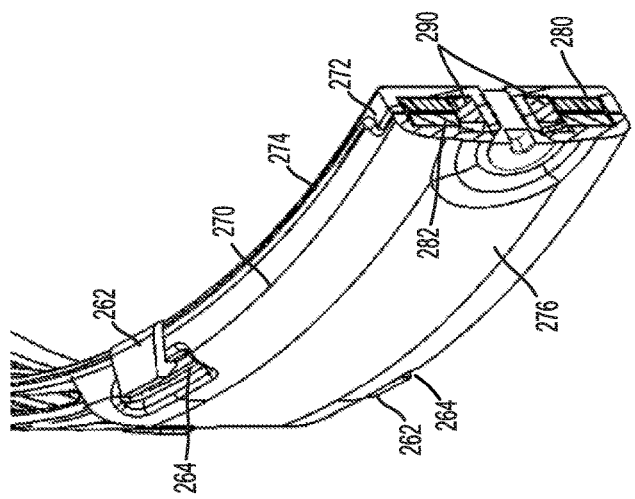
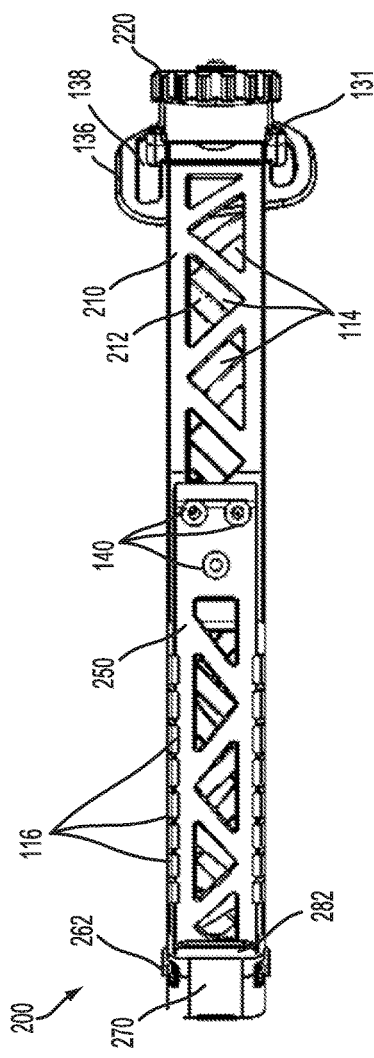
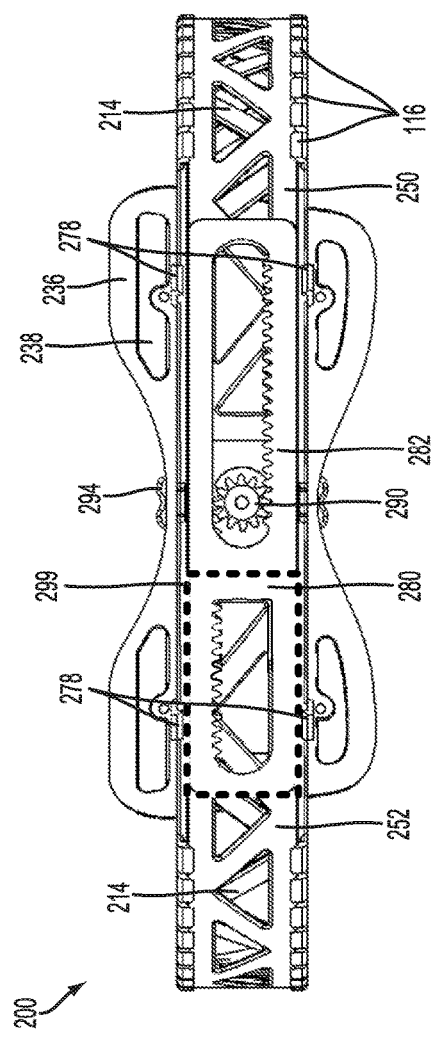
FIG. 7
FIG. 8
FIG. 9

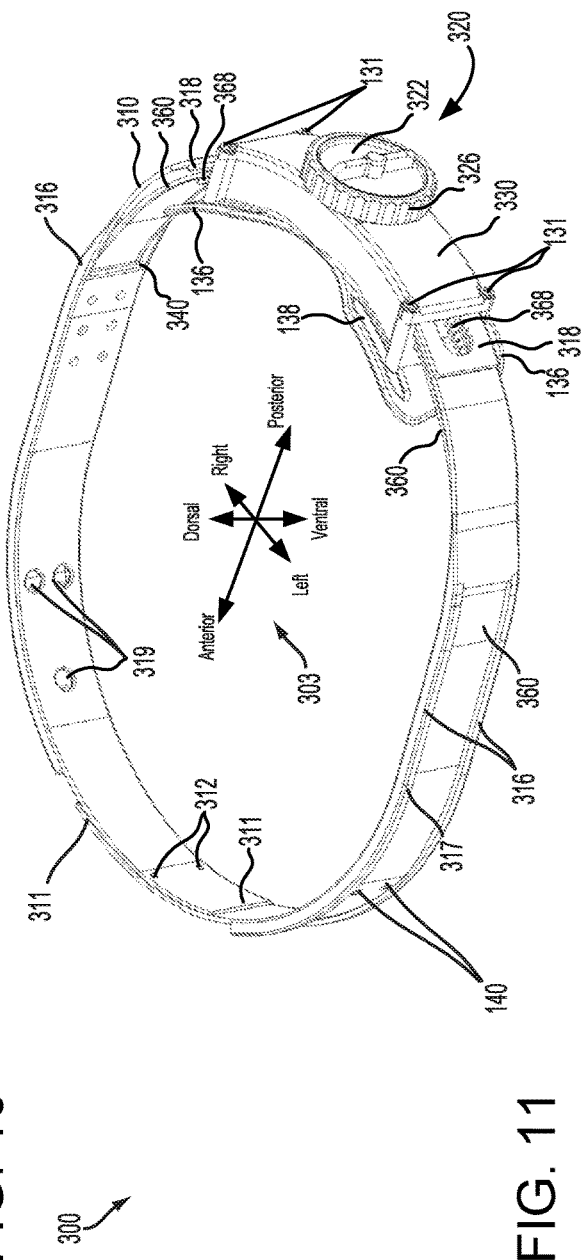
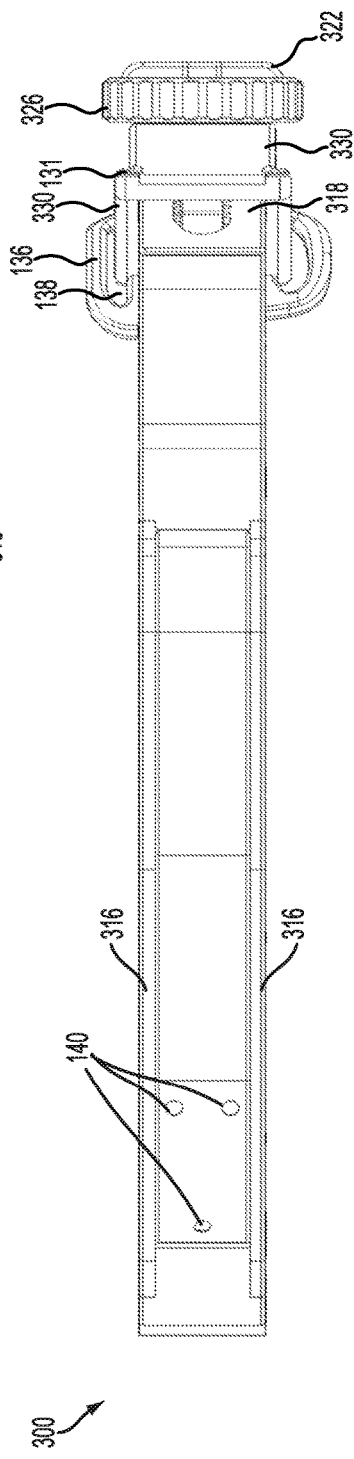
FIG. 10
FIG. 11

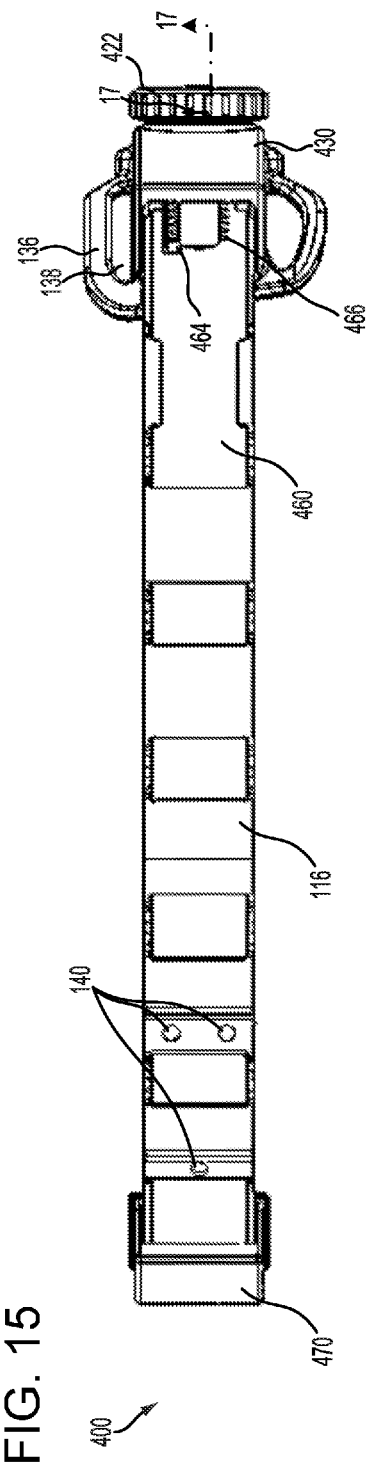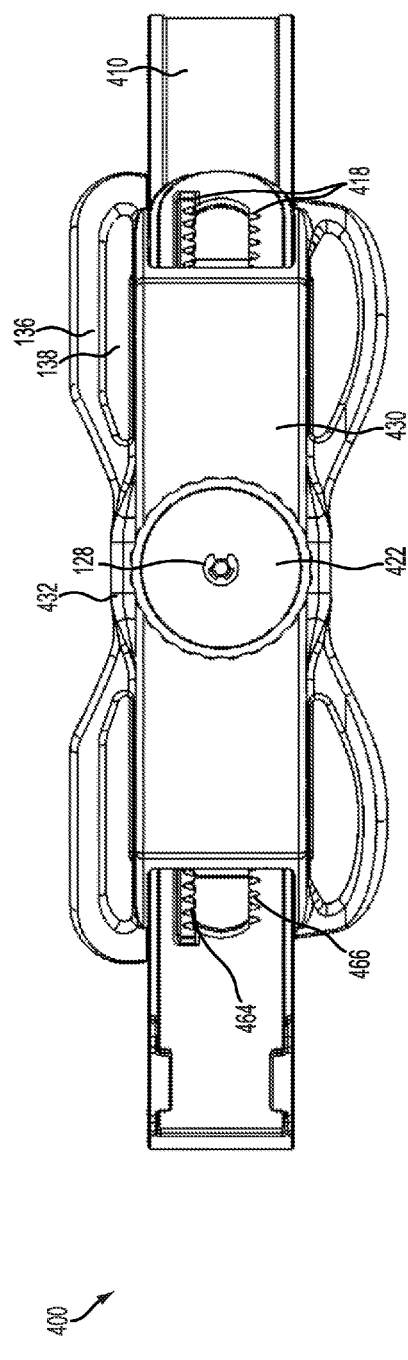

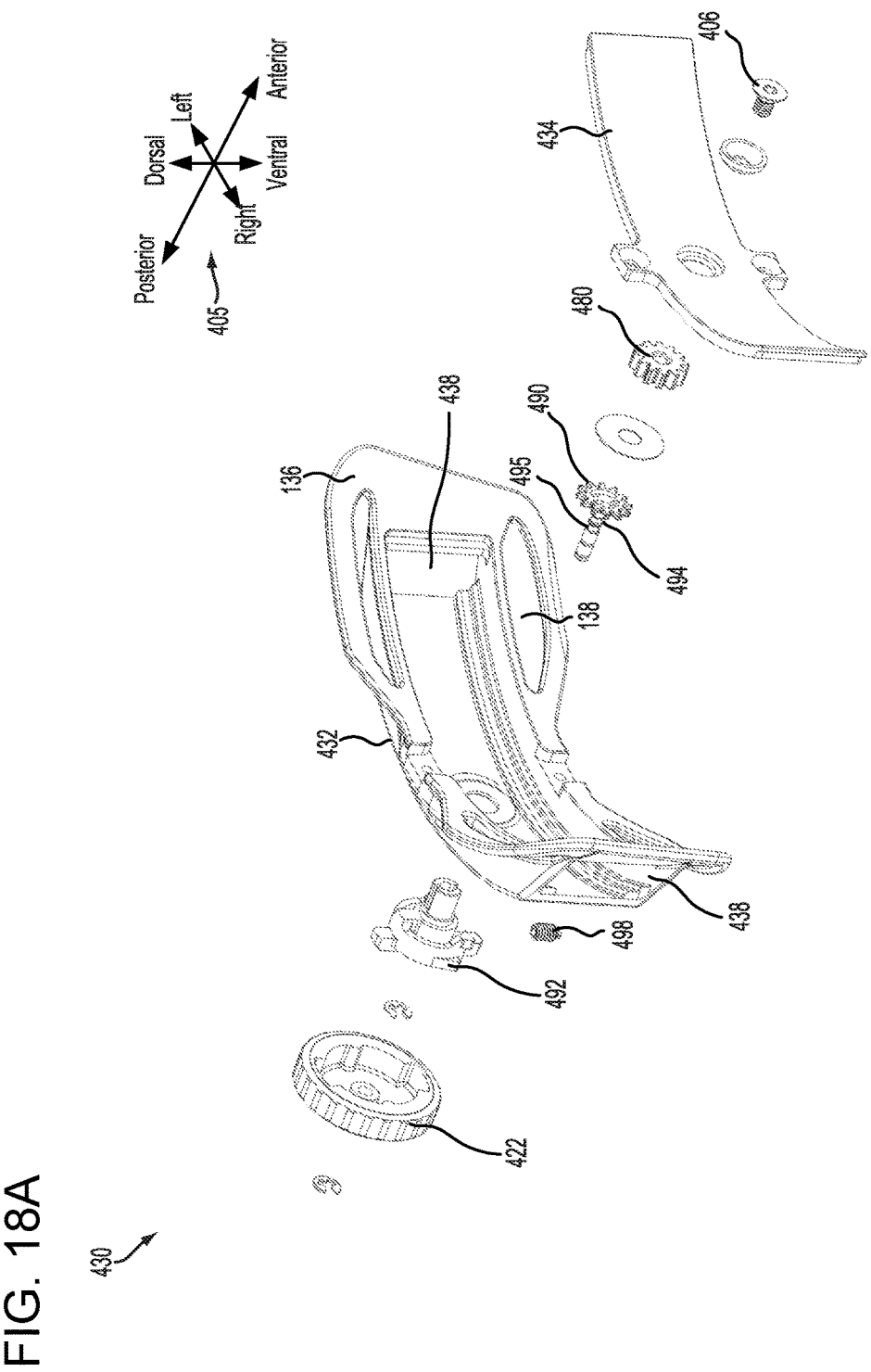

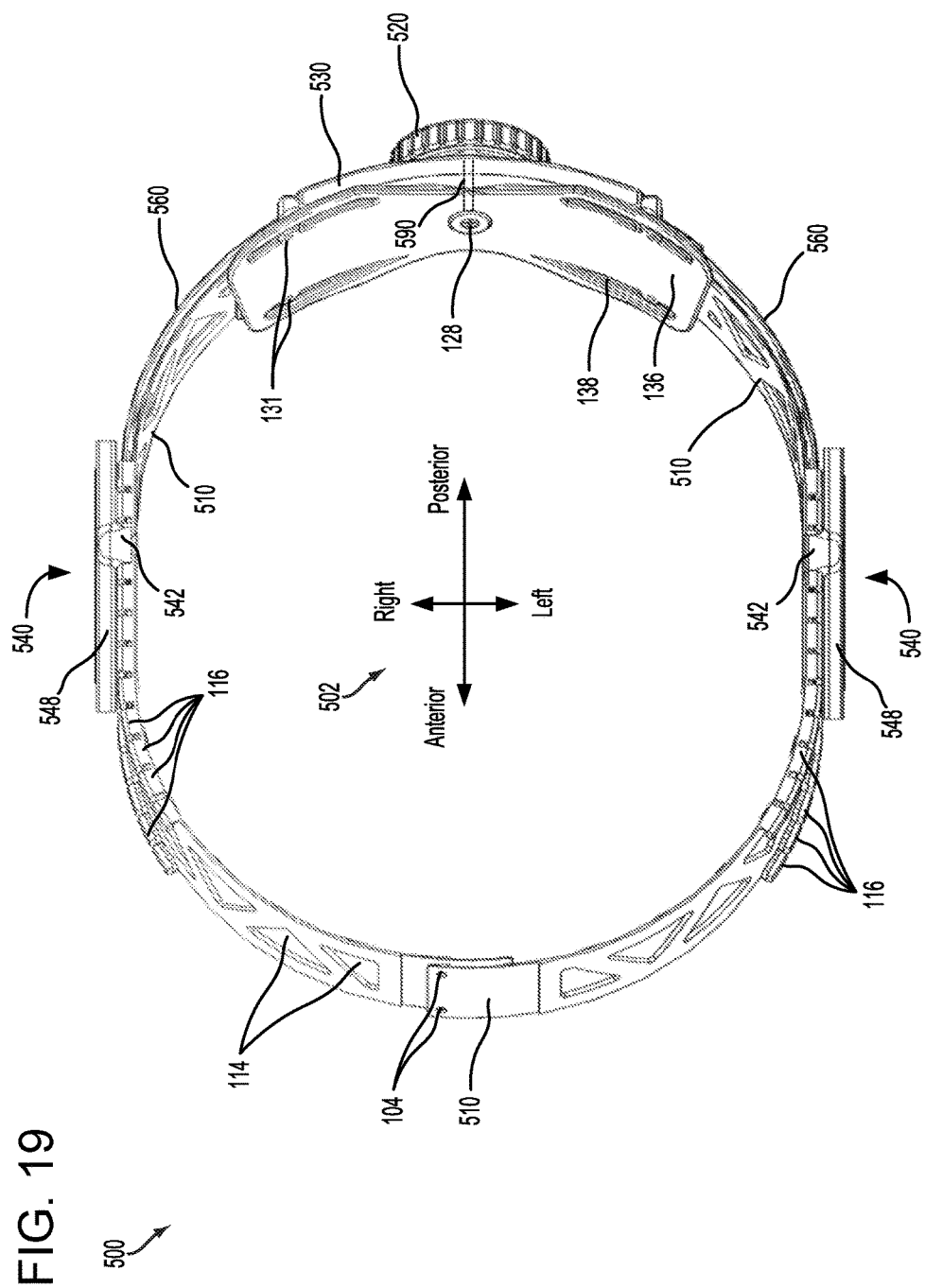

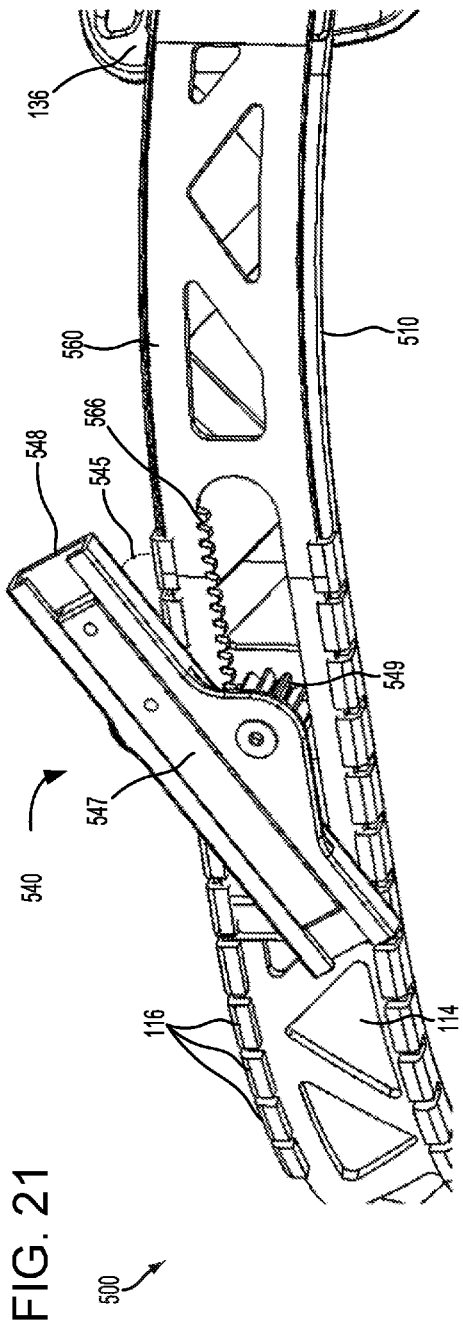
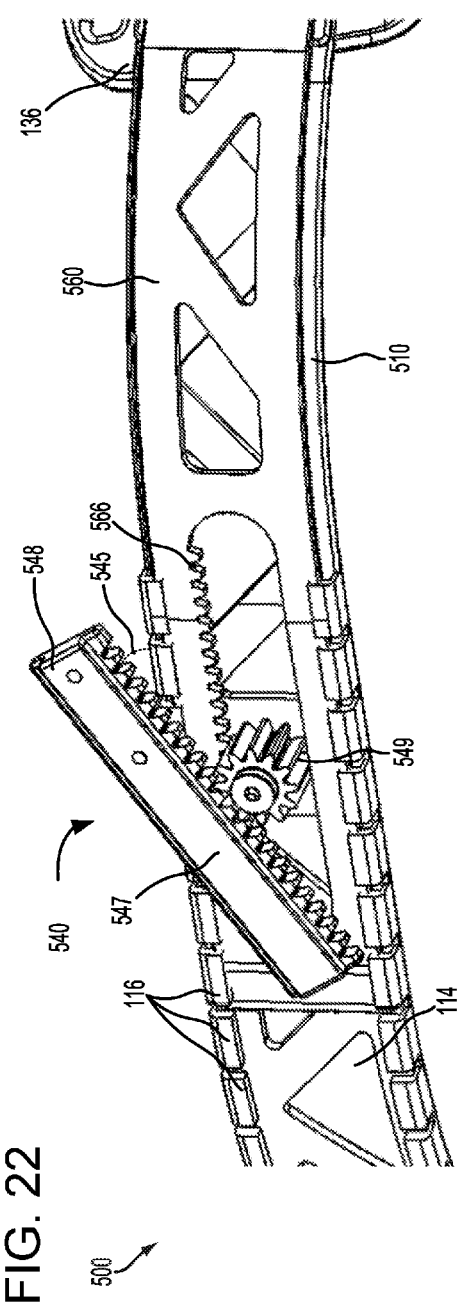

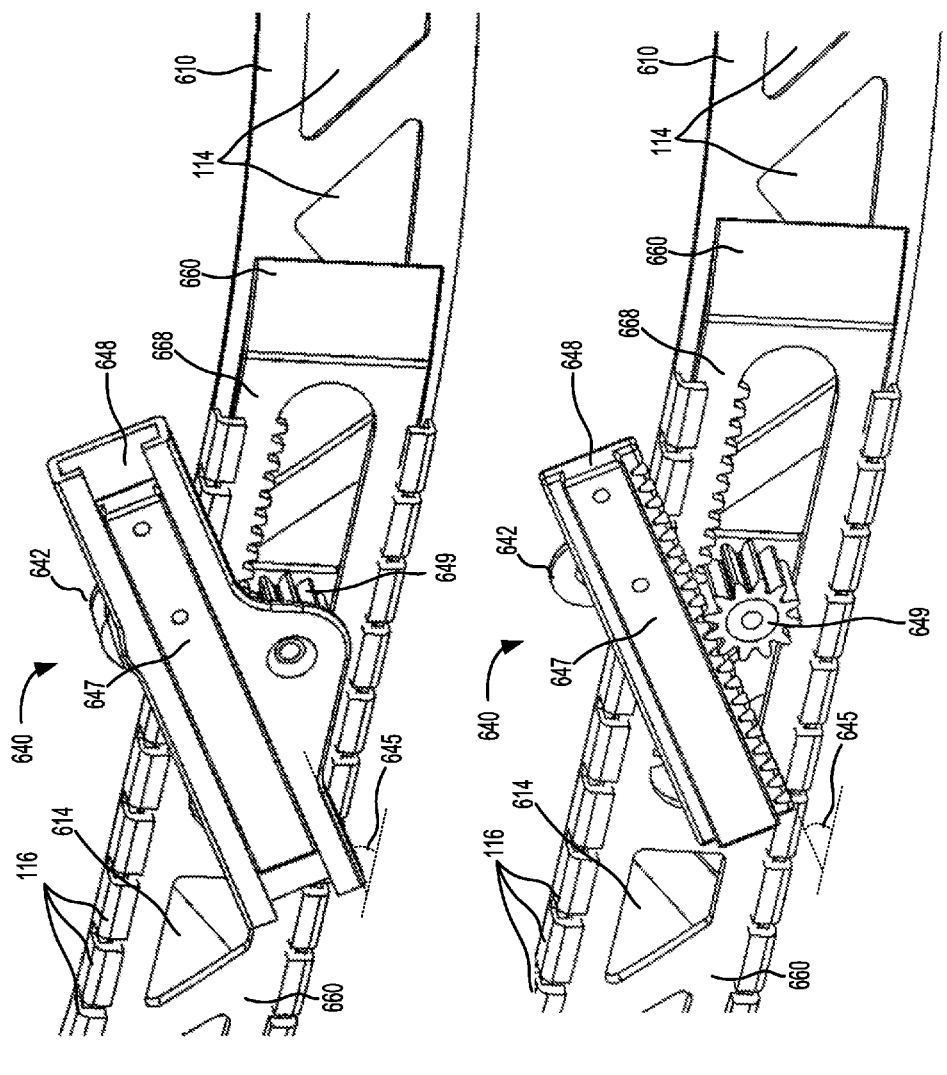

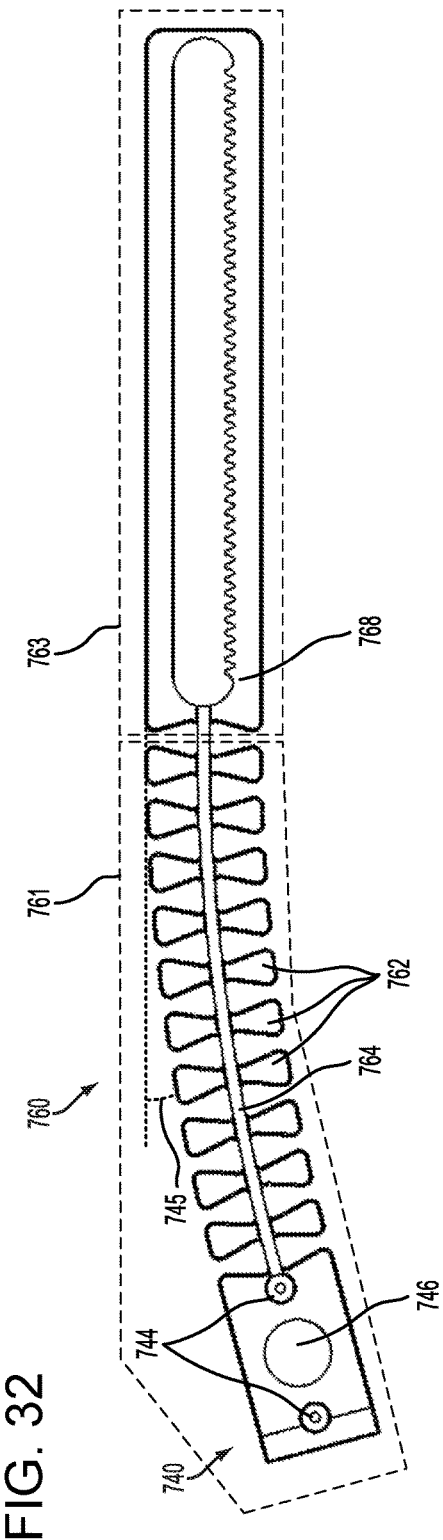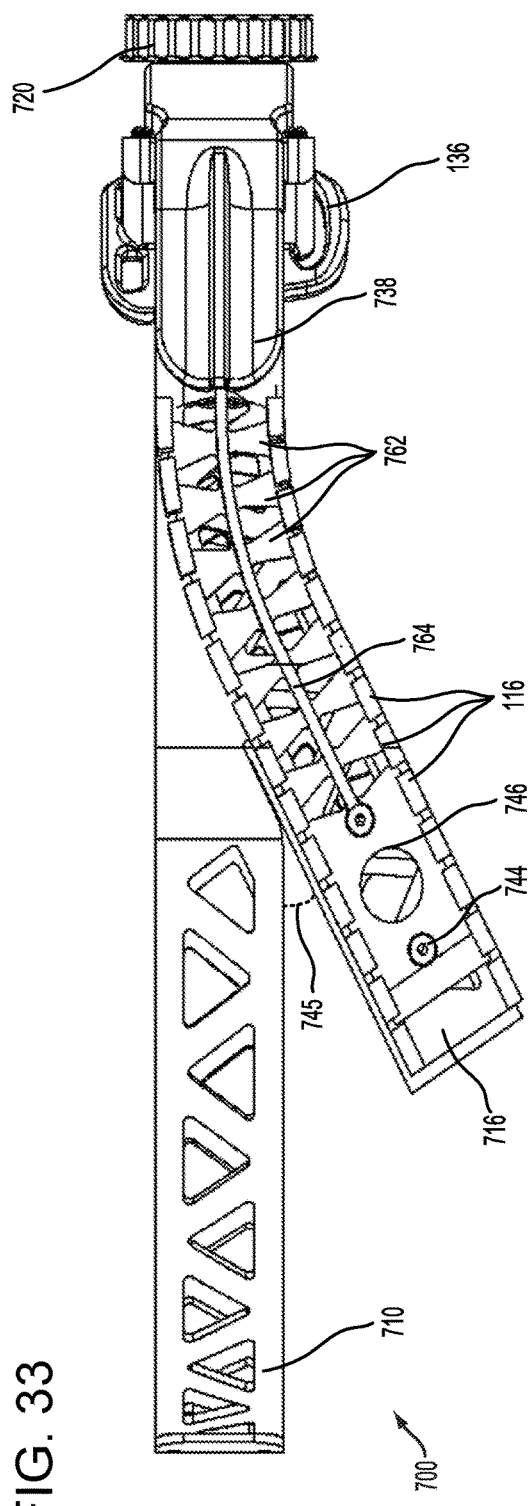

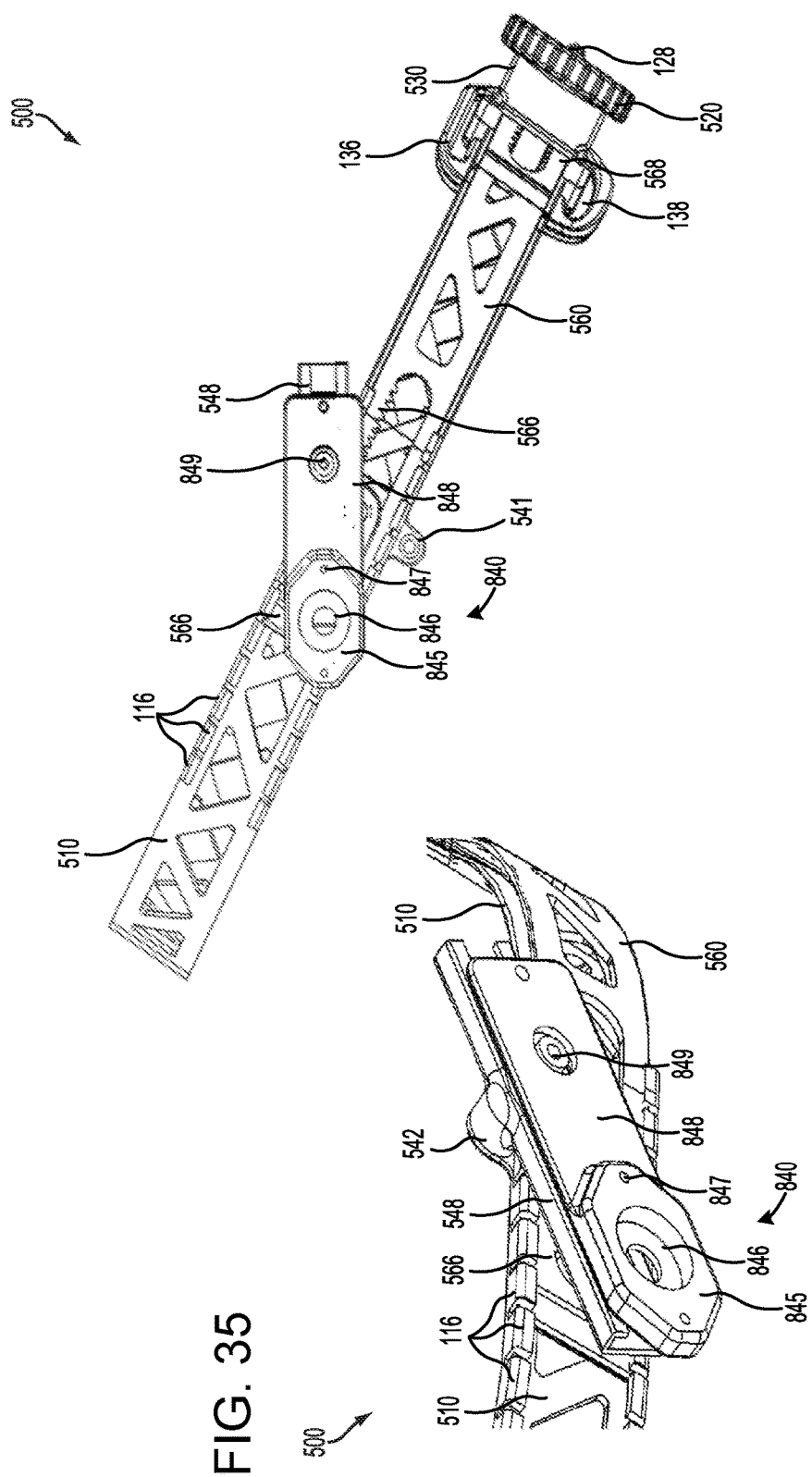

AUGMENTED REALITY SYSTEM EYE RELIEF ADJUSTMENT MECHANISM

CROSS REFERENCE TO RELATED APPLICATIONS

This application is a continuation of U.S. patent application Ser. No. 14/268,552, filed on May 2, 2014, and titled "AUGMENTED REALITY SYSTEM EYE RELIEF ADJUSTMENT MECHANISM", the entire disclosure of which is hereby incorporated herein by reference.

BACKGROUND

Augmented or virtual reality systems exist for simulating virtual environments within which a user may be immersed. Displays such as heads-up displays (HUDs), head-mounted displays (HMDs), and the like, may be utilized to display the virtual environment. In order to maintain user comfort and proper alignment of the display relative to the eyes of the user in the immersive environment, an HMD may have to accommodate various head sizes and various eye relief distances. Conventional HMDs employ pivoting hinge and plate mechanisms to adjust eye relief for various user head sizes, which can be bulky, cumbersome to manipulate, and may not accommodate a broad range of user head sizes and eye relief distances. Failure to accommodate a user's head size can result in the HMD being too tight and causing discomfort, or too loose and moving relative to the user's head during use, negatively impacting the user's experience. Failure to maintain proper eye relief distance can adversely impact the user's ability to properly perceive the augmented reality elements displayed on the display of the HMD.

SUMMARY

According to one aspect of this disclosure, a head mounted display (HMD) to be worn by a user comprises an adjustable crown band, a crown band circumference adjusting mechanism coupled to the adjustable crown band and configured to adjust a circumference of the crown band to releasably secure the crown band to the crown of the user, an armature including a left arm and a right arm, each of the left and the right arm mounted at a respective proximal end to corresponding left and right attachment structures on the HMD, a display mounted at left and right sides to respective distal ends of the left and right arms, and an eye relief distance adjustment mechanism configured to move the left and right arms in a timed manner toward and away from the crown band along a substantially linear path, to thereby adjust an eye relief distance from the display to an eye of a user when the crown band is fitted on the crown of the user.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a cross-sectional view of the HMD device of FIG. 1 taken at section 3-3.

FIG. 4 is a posterior view of the HMD device of FIG. 1

FIG. 7 is a side view of the HMD device of FIG. 5.

FIG. 8 is a cross-sectional perspective view of HMD device of FIG. 5.

FIG. 9 is an anterior view of the HMD device of FIG. 5

FIG. 10 is a posterior perspective view of an illustrative example of an HMD device in accordance with a third embodiment of the present disclosure.

FIG. 11 is a side view of HMD device of FIG. 10.

FIG. 15 is a side view of the HMD device of FIG. 14.

FIG. 16 is a posterior view of the HMD device of FIG. 14.

FIG. 18A is an exploded perspective view of an example posterior housing of the HMD device of FIG. 14.

FIG. 19 is a perspective view of an illustrative example of an HMD device in accordance with a fifth embodiment of the present disclosure.

FIG. 21 is a partial side perspective view of the HMD device of FIG. 19.

FIG. 22 is a partial side perspective view of the HMD device of FIG. 19.

FIG. 25 is a partial side perspective view of the HMD device of FIG. 24.

FIG. 26 is a partial side perspective view of the HMD device of FIG. 24.

FIG. 32 is a side view of an eye relief band of the HMD device of FIG. 29.

FIG. 33 is a side view of the HMD device of FIG. 29.

FIG. 35 is a partial side perspective view of the HMD device of FIG. 34.

FIG. 36 is a side view of the HMD device of FIG. 34.

DETAILED DESCRIPTION

Figure 1:
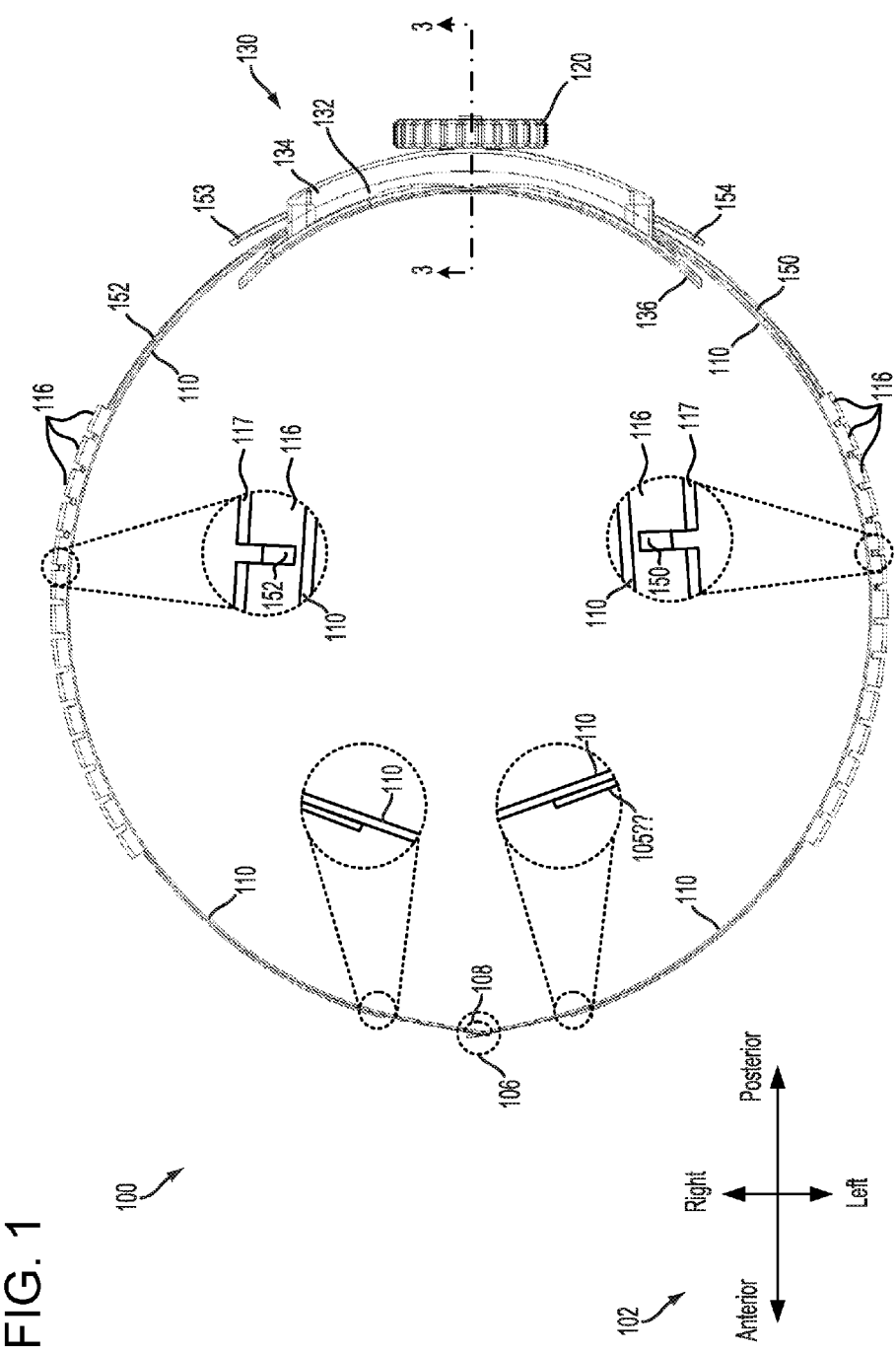
FIG. 1 is a plan view of an illustrative example of a crown portion of an HMD device including a crown band circumference adjustment mechanism and an eye relief distance adjustment mechanism in accordance with a first embodiment of the present disclosure.

The subject matter of this disclosure is now described by way of example and with reference to certain illustrated embodiments. Components that may be substantially similar in one or more embodiments are identified coordinately. It will be noted, however, that components identified coordinately may also differ to some degree.

Referring now to FIGS. 1-4, various views of an HMD device 100 according to a first embodiment of the present disclosure are illustrated. To address the challenges discussed above, an HMD may include HMD device 100 to be worn by a user, the HMD device 100 comprising an adjustable crown band 110. The circumference of the adjustable crown band 110 may be adjusted by a crown band circumference adjusting mechanism coupled to the adjustable crown band, the crown band circumference adjusting mechanism configured to adjust a circumference of the crown band to releasably secure the crown band to the crown of the user. In the example embodiment shown in FIGS. 1-4, the crown band circumference adjusting mechanism comprises the adjustable crown band 110, knob 120, housing 130, and crown racks 118. By rotating the knob 120 in a first or second direction, crown racks 118 may be driven to either increase or decrease the circumference of the adjustable crown band 110, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

Figure 37:
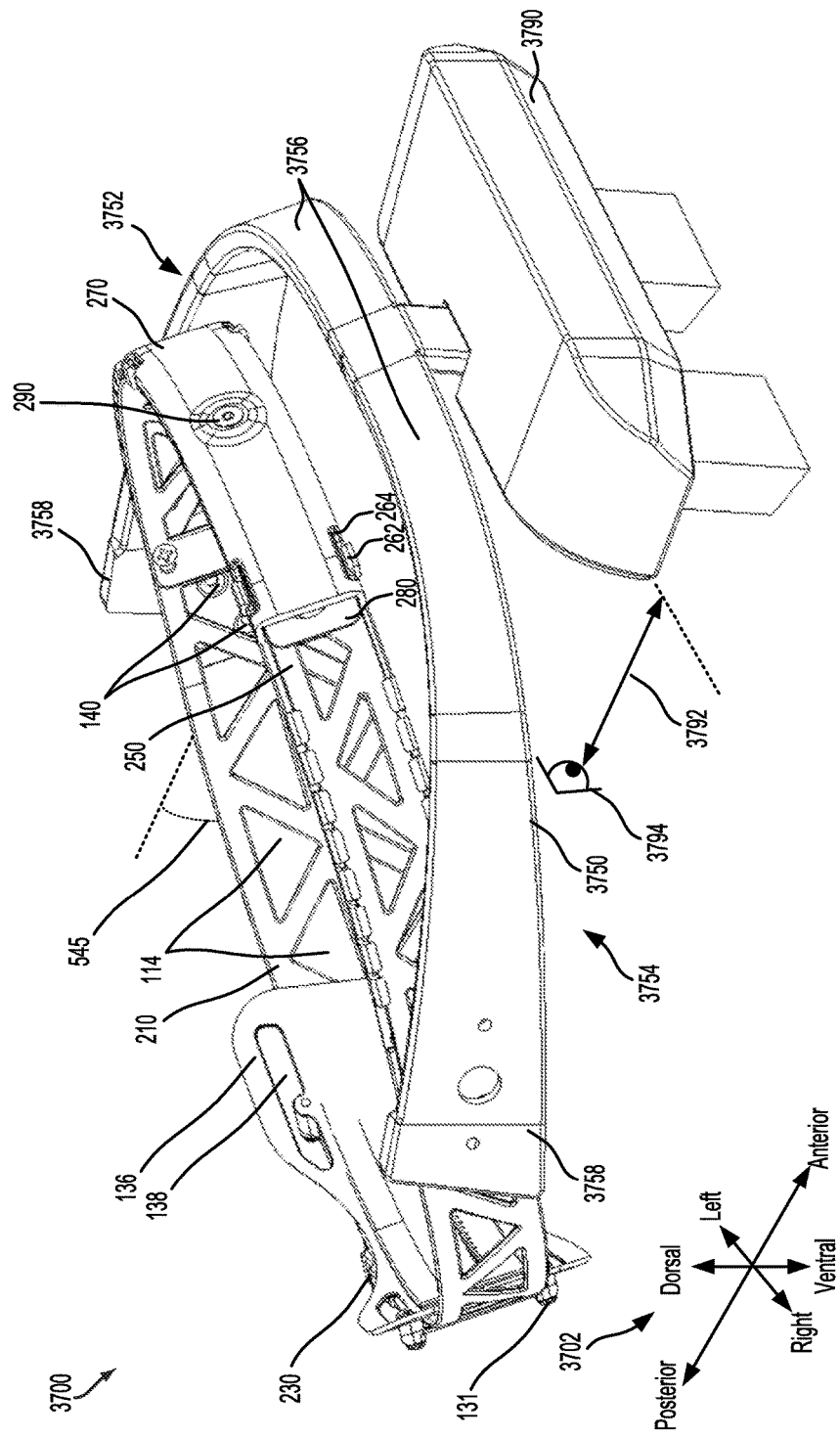
FIG. 37 is a perspective view of an illustrative example of a complete HMD device, including the crown portion of the HMD device and an HMD display.
Figure 38:
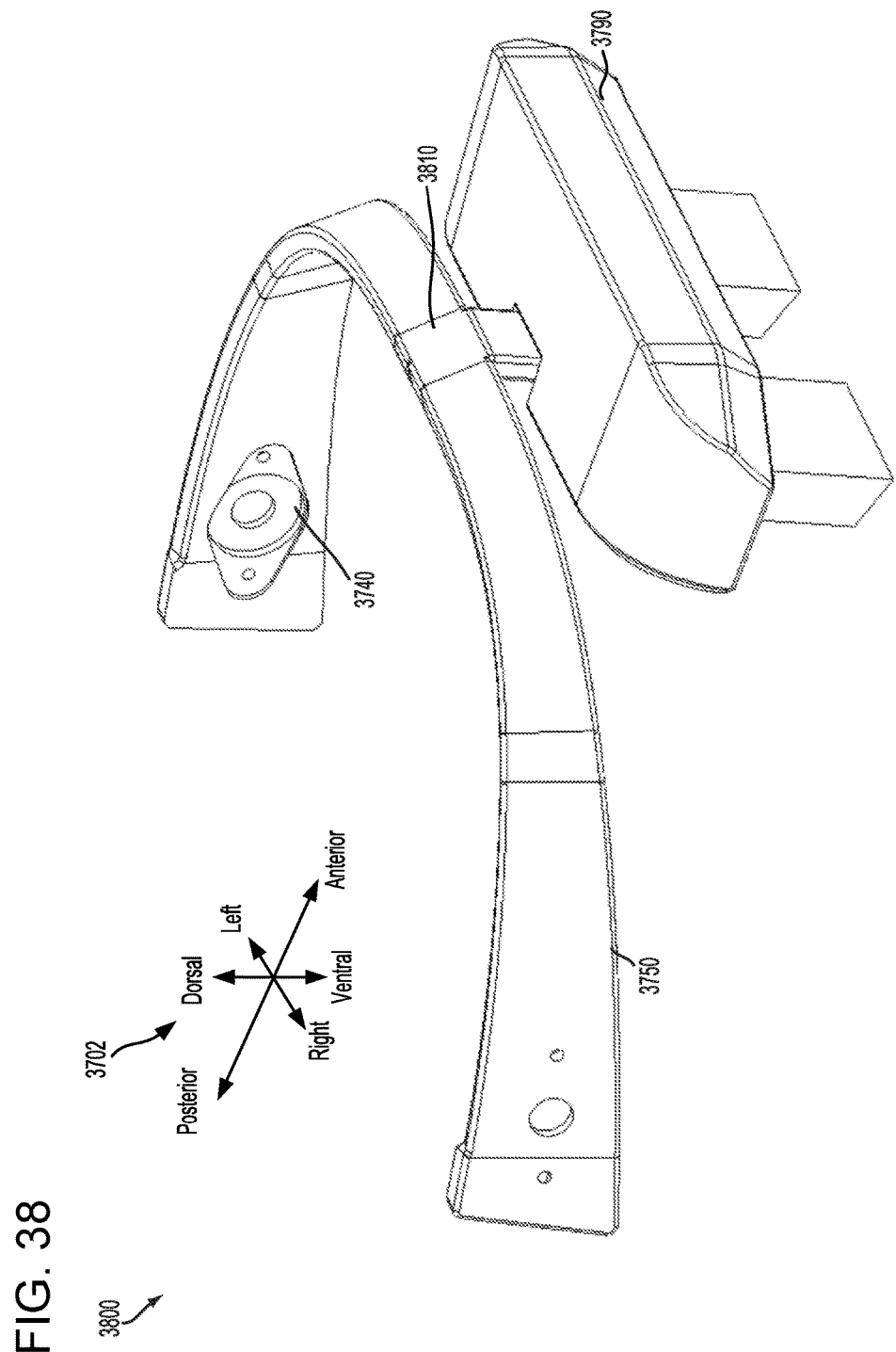
FIG. 38 is a perspective view of an armature of an HMD coupled to an HMD display.
Figure 39:
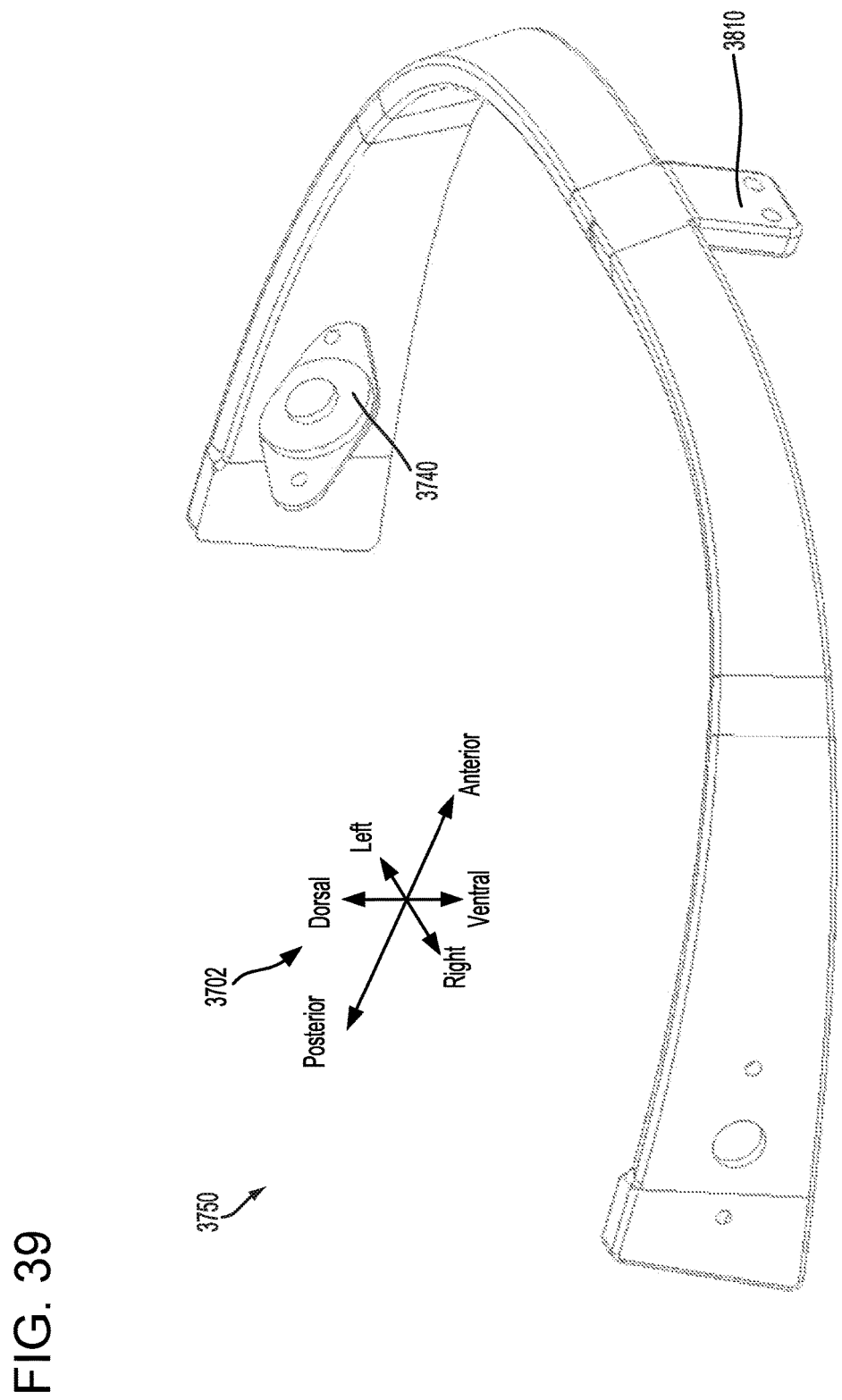
FIG. 39 is an isolated perspective view of an armature.

As shown in FIGS. 37-39, the HMD may further comprise an armature 3750, including a left arm 3752 and a right arm 3754, each of the left and the right arm mounted at a respective proximal end 3758 to corresponding left and right attachment structures 140 on the HMD device 100. Attachment structures 140 may comprise a plurality of mounting holes to which armature 3750 may be mounted. In other examples, attachment structures may comprise hooks, clips, rivets, screw, and other attachment mechanisms. The armature supports and affixes a display assembly 3790 to the HMD device 100, the display assembly 3790 mounted at left and right sides to respective distal ends 3756 of the left and right arms 3752, 3754.

The HMD device 100 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 1-4, the eye relief distance adjustment mechanism comprises left and right eye relief bands 150 and 152, knob 120, housing 130, eye relief racks 156, attachment structures 140, and sliding structures 116. By rotating knob 120 in a first or second direction, eye relief racks 156 may be driven to move the attachment structures (along with the armature 3750 and display assembly 3790) in a timed manner anteriorly or posteriorly, respectively, along the distal surface of the adjustable crown band 110 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

Figure 2:
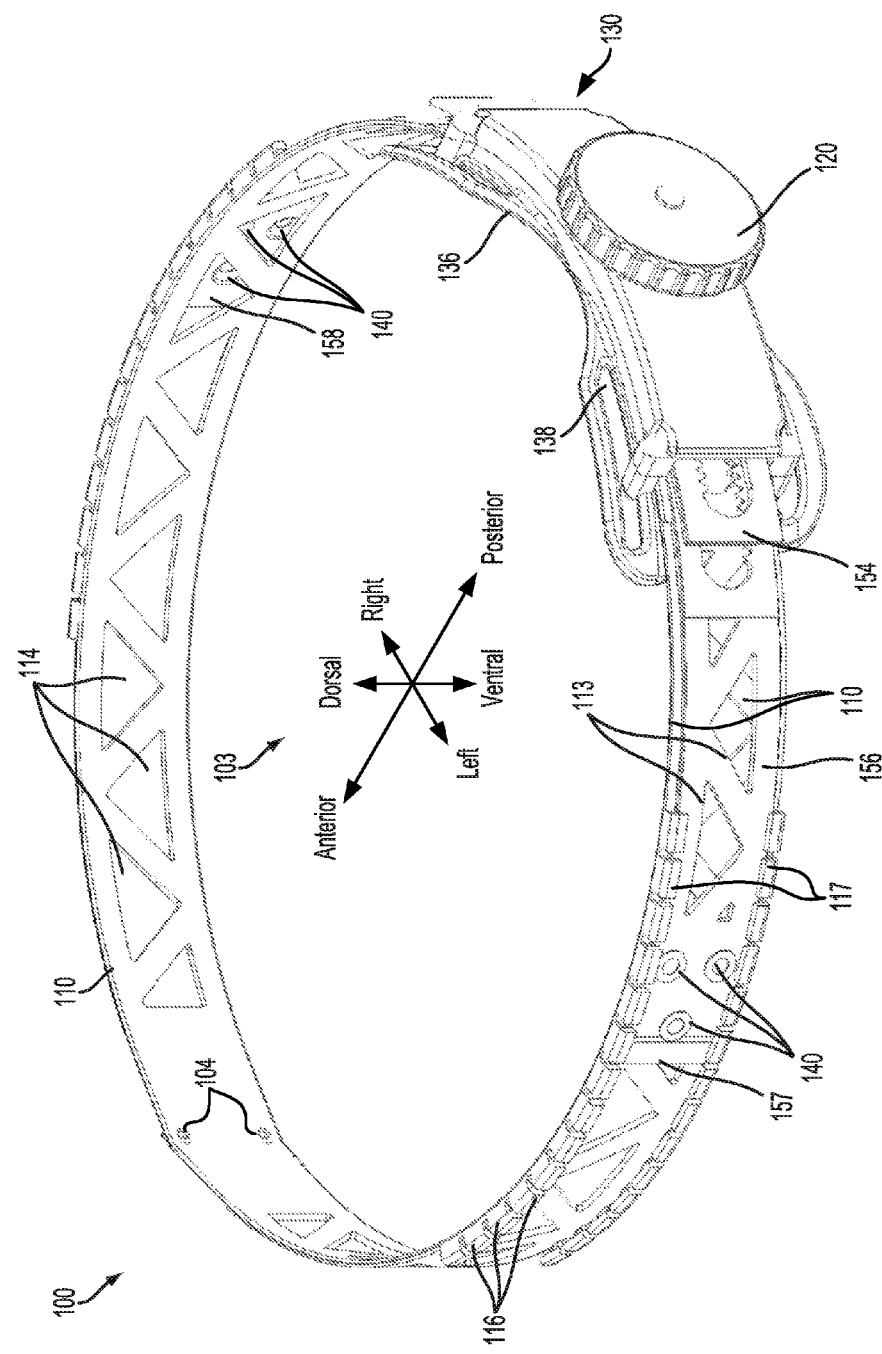
FIG. 2 is a rear perspective view of the HMD device of FIG. 1.

Also depicted in FIGS. 1 and 2 are axes 102 illustrating anterior, posterior, left, and right directions, and axes 103 illustrating dorsal, ventral, anterior, posterior, left, and right directions. Left and right ends of the adjustable crown band 110 extend posteriorly from left and right sides, respectively, and wrap around a user's crown at a posterior side, passing through and overlapping inside a housing 130 mounted at a posterior end of the HMD device 100. In some examples, the left and right ends of the adjustable crown band 110 may overlap and extend beyond the housing 130 such that left and right ends of the adjustable crown band 110 extend to posterior right and left sides, respectively of the HMD device 100.

The adjustable crown band 110 also extends anteriorly from left and right sides, respectively, and wraps around a user's crown at an anterior side when the HMD device 100 is worn by the user. At the anterior side, adjustable crown band 110 may comprise a hinged structure 106 positioned at an anterior side of the HMD device 100, the hinged structure 106 including fasteners 104. The hinged structure 106 may pivot to enlarge and contract an angle 108 between a left and right anterior ends of the adjustable crown band 110 to aid in the HMD device 100 easily and comfortably fitting a wide range of crown circumferences at an anterior side of the HMD device 100. In this way, both the hinged structure 106 and the inherent flexibility of the crown band 110 may aid in easily and comfortably fitting a wide range of crown circumferences at an anterior side of the HMD device 100. Fasteners 104 may serve to restrict an angle 108 and/or to reinforce a hinged structure 106 and to strengthen the hinged structure 106 and/or the adjustable crown band 110 thereat. In some examples, left and right anterior ends 107 of the adjustable crown band 110 may comprise a continuous length of crown band instead of the hinged structure 106, and the inherent flexibility of the crown band 110 may aid in easily and comfortably fitting a wide range of crown circumferences at an anterior side of the HMD device 100 without the hinged structure 106.

Furthermore, adjustable crown band 110 may further comprise a plurality of cutouts 114 distributed throughout a length of the adjustable crown band 110. Cutouts 114 may aid in reducing the weight and in increasing the flexibility of the adjustable crown band 110, thereby increasing fit and comfort. Cutouts 113 in the left and right eye relief bands 150, 152 may aid in reducing the weight and in increasing the flexibility of the left and right eye relief bands 150, 152, thereby increasing fit and comfort. Cutouts 113 and 114 are shown as triangular, however, the shape of cutouts 113 and 114 may be rectangular, circular, polygonal, and the like.

Left and right eye relief bands 150, 152 flexibly wrap around the adjustable crown band extending from left and right anterior eye relief band ends 157, 158 at left and right sides to a posterior side of the HMD device 100, passing through and overlapping inside the housing 130. In some examples, left and right posterior ends 153, 154 of the left and right eye relief bands 150, 152 may overlap and extend beyond the housing 130 such that left and right ends 153, 154 of the left and right eye relief bands 150, 152 extend to posterior right and left sides, respectively of the HMD device 100.

Housing 130 may comprise a crown rack housing 132 and an eye relief rack housing 134. As such, left and right ends of the adjustable crown band may pass through and overlap inside the crown rack housing 132, separately from left and right eye relief bands 150, 152, which may pass through and overlap inside the eye relief rack housing 134. In this way, interference between the adjustable crown band 110 and the left and right eye relief bands 150, 152 as they pass through the housing 130 is reduced. Housing 130 further comprises a knob 120, and a curved housing posterior support band 136, as will be further described below.

Left and anterior eye relief band ends 157, 158 may slidably engage with and be retained adjacent to a distal surface of the adjustable crown band 110 by a plurality of sliding structures 116 mounted at left and right distal sides of the adjustable crown band 110. Sliding structures 116 may extend distally relative to the adjustable crown band 110 and the user's crown, from both dorsal and ventral edges of the adjustable crown band 110, greater than a thickness of the left and right eye relief bands 150, 152. In the embodiment of FIGS. 1-4, the sliding structures 116 comprise a plurality of clips; however in other example embodiments the sliding structures 116 may comprise loops, bands, rails, or other structures that guide and facilitate sliding of the eye relief bands 150, 152 adjacent to a distal surface of the adjustable crown band 110. Furthermore, tips 117 of the sliding structures 116 may extend in ventral and dorsal direction from dorsal and ventral edges, respectively, of the adjustable crown band 110, to retain left and right eye relief bands 150, 152 adjacent and wrapped around an outer surface of the adjustable crown band 110. In particular, a distance between tips 117 in the dorsal-ventral direction may be less than a width of the eye relief racks 156 in the dorsal-ventral direction. A number of the sliding structures 116, and a spacing between each of the sliding structures 116 may be predetermined to smooth sliding of the eye relief bands 150, 152 along the distal surface of the adjustable crown band 110 and to reduce snagging of the eye relief bands 150, 152 on the edges of the sliding structures 116. For example, the sliding structures may extend over a length of the adjustable crown band 110 on the left and right sides and the spacing between each individual sliding structure may be small enough to facilitate sliding of the left and right eye relief bands 150, 152 directly adjacent to the adjustable crown band 110. Furthermore, sliding structures 116 may each comprise tips 117, including beveled distal edges, to increase user comfort while grasping the adjustable crown band 110, for example, to don or doff the HMD device 100.

Turning now to FIGS. 3 and 4, a partial cross-sectional view taken at section 3-3 and a posterior view, respectively, of the HMD device 100 are illustrated. As shown in FIG. 3, left and right ends of the adjustable crown band 110 may each include a crown rack 118 passing through and overlapping inside crown rack housing 132. Furthermore, left and right posterior ends 153, 154 of the left and right eye relief bands 150, 152 may each include an eye relief rack 112 passing through and overlapping inside eye relief rack housing 134. Crown racks 118 and eye relief racks 112 may be engaged to a pinion 122, and pinion 122 may be mounted to the housing 130 and rotatably coupled to knob 120 via a ratchet 124. Ratchet 124 may rotationally lock the pinion 122 in one or both directions. For example, ratchet 124 may rotationally lock pinion 122 in the crown tightening direction (e.g., where rotation of the pinion 122 reduces a crown circumference). As shown in FIG. 3, eye relief racks 112 may be coupled to pinion 126. Pinion 126 is mounted to the housing 130 and may be rotatably coupled to knob 120. As such, when knob 120 is rotated, pinion 122 engages crown racks 118 to adjust a length of the left and right crown racks passing through the first housing, thereby adjusting a circumference of the crown band in a timed manner. Furthermore, pinion 126 may not be rotatably coupled to pinion 122 so that pinion 126 may be rotated independently from pinion 122. Further still, translation of eye relief racks 112 and rotation of pinion 126 may be restrained by frictional forces between the eye relief racks 112 and attachment structures 116, between the eye relief racks 112 and the housing 130, between the eye relief racks 112 themselves, between the pinion 126 and the eye relief racks 112, and the like. These frictional forces may be overcome when knob 120 is rotated, thereby causing pinion 126 to engage eye relief racks 112 to adjust a length of the left and right eye relief racks passing through the housing 130, thereby adjusting the anterior-posterior positioning of the attachment structures 140 in a timed manner with the adjustment of the crown circumference. These frictional forces may also be overcome by applying a pushing or pulling force to the display posteriorly or anteriorly relative to a user's eye's to adjust an eye relief distance.

Because the display assembly 3790 is mounted to armature 3750, which is mounted at attachment structures 140, rotating the knob 120 may adjust the eye relief distance 3792. Rotating knob 120 in a first direction may decrease a length of the left and right crown racks passing through the housing to increase a circumference of the adjustable crown band 110, while rotating knob 120 in a second direction may increase a length of the left and right crown racks passing through the housing to decrease a circumference of the adjustable crown band 110. Furthermore, rotating knob 120 in a first direction may decrease a length of the left and right eye relief racks passing through the housing to increase an eye relief distance 3792, while rotating knob 120 in a second direction may increase a length of the left and right eye relief racks passing through the housing to decrease an eye relief distance 3792.

Housing 130 may further comprise retaining screw 128 and washer 129 for securing knob 120, and housing posterior head support band 136 for comfortably supporting the housing 130 against the posterior surface of the user's crown. Housing posterior head support band 136 may be wider than a width of the eye relief bands 150, 152 and adjustable crown band 110 to reduce a pressure against a posterior surface of the user's crown, and may comprise a plurality of cutouts 138 which may reduce the weight of the HMD, and may impart increased flexibility to the housing posterior head support band 136. Housing fasteners 131 may secure housing 130 around the crown racks 118 and eye relief racks 112.

Sliding structures 116 positioned on the distal side of both dorsal and ventral edges of the adjustable crown band 110 guide the eye relief bands 150, 152 to translate along a substantially linear path in a direction aligned with the adjustable crown band 110. In addition to adjusting eye relief by rotation of knob 120, a pushing force towards or a pulling force away from the user's eyes applied to the display assembly 3790 mounted to armature 3750, which is mounted to HMD device 100 at attachment structures 140, may decrease or increase the eye relief distance, respectively. In this way, the eye relief bands 150, 152, may be slid across the surface of the adjustable crown band 110, as they are held in position by sliding structures 116. The friction force between the eye relief bands 150,152 and adjustable crown band 110 and the sliding structures 116 may influence the pushing and pulling forces required to adjust the eye relief distance. Furthermore, adjusting the eye relief distance adjustment mechanism and the crown circumference adjustment mechanism to achieve a particular eye relief distance may include adjusting the eye relief bands, accounting for the adjustment of the adjustable crown band 110, since both the crown band and eye relief bands may be grounded to the pinion 122 of the rear housing. In other words, when the circumference of the adjustable crown band 110 is adjusted via rotating knob 120, the eye relief bands 150, 152 may also be adjusted via application of a pushing and/or pulling force to the display assembly 3790 to maintain an eye relief distance 3792 while achieving a comfortable fit to the user's crown.

The adjustable crown band 110, and the left and right eye relief bands 150, 152 may be flexible to enable bending and flexing thereof to follow the curvature of a user's crown so that a close and comfortable fit of the HMD to the user's crown can be achieved. At least one or more of cutouts 113, 114, structural features of sliding structures 116 (e.g., spacing therebetween), cutout 138, curved housing posterior support band 136, and the material of construction thereof may thus substantially impart flexibility and elasticity to the HMD device 100 so that a close and comfortable fit to a broad range of user crown sizes may be achieved.

Figure 5:
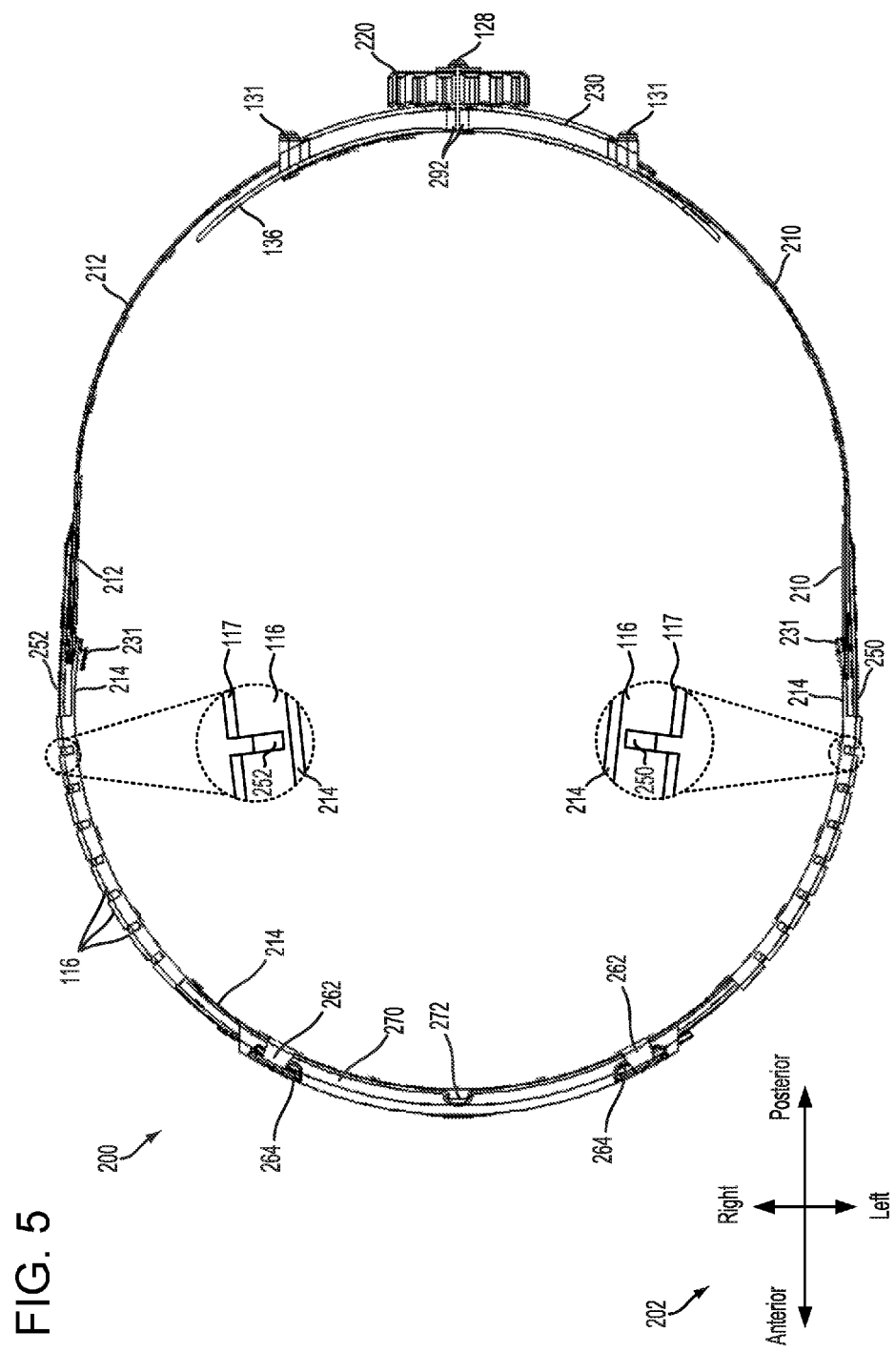
FIG. 5 is a plan view of an illustrative example of an HMD device in accordance with a second embodiment of the present disclosure.
Figure 6:
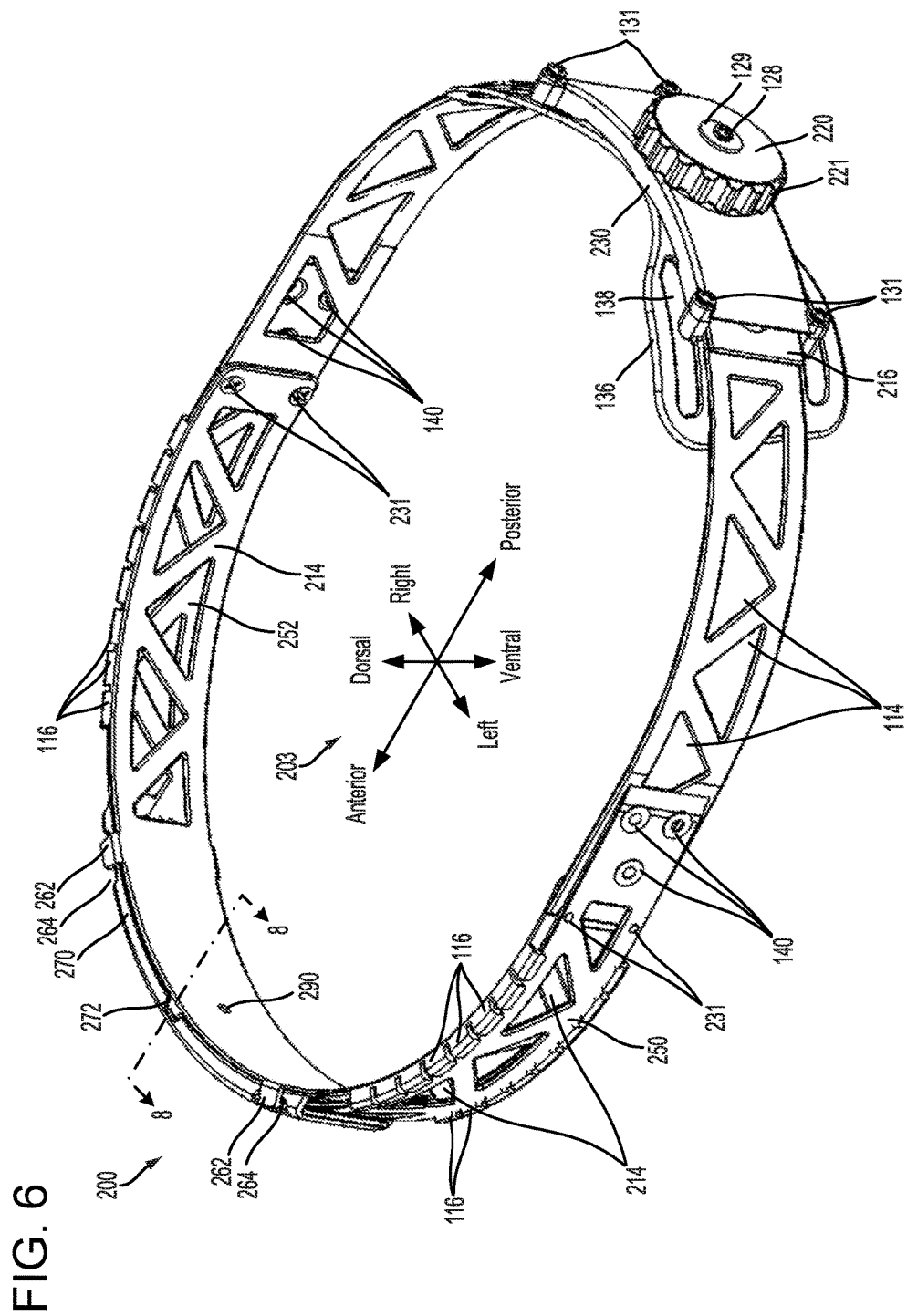
FIG. 6 is a posterior perspective view of the HMD device of FIG. 5.

Turning now to FIGS. 5-6, plan and rear perspective views are illustrated of a second example embodiment for an HMD device 200, including axes 202, 203 indicating dorsal, ventral, anterior, posterior, left, and right directions. An HMD may include HMD device 200 to be worn by a user, the HMD device 200 comprising an adjustable crown band 210. The circumference of the adjustable crown band 210 may be adjusted by a crown band circumference adjusting mechanism coupled to the adjustable crown band, the crown band circumference adjusting mechanism configured to adjust a circumference of the crown band to releasably secure the crown band to the crown of the user. In the example embodiment shown in FIGS. 5-9, the crown band circumference adjusting mechanism comprises the adjustable crown band 210, knob 220, housing 230, and crown racks 216. By rotating the knob 220 in a first or second direction, crown racks 216 may be driven to either increase or decrease the circumference of the adjustable crown band 210, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 200 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 5-9, the eye relief distance adjustment mechanism comprises left and right eye relief bands 250 and 252, knob 220, housing 230, eye relief racks 280, 282, attachment structures 140, and sliding structures 116. By applying a pulling force toward or a pushing force away from a user's eyes, eye relief racks 280, 282 may be driven to move the attachment structures (along with the armature 3750 and display assembly 3790) in a timed manner anteriorly or posteriorly, respectively, along the distal surface of the adjustable crown band 210 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

HMD device 200 includes left and right adjustable crown bands 210, 212 that extend posteriorly from left and right sides and wrap around the posterior of a user's crown when the HMD device 200 is worn on the user's head. At the posterior side of the HMD device 200, ends of the left and right adjustable crown bands 210, 212 may pass through and overlap inside a crown rack housing 230 mounted at a posterior end of the HMD device 200. In some examples, left and right adjustable crown bands 210, 212 may overlap and extend beyond right and left sides of the crown rack housing 230, respectively. Ends of the left and right adjustable crown bands 210, 212 may each include a crown rack 216 mounted thereto. Crown racks 216 may pass through and overlap inside crown rack housing 230 and may be engaged to a crown rack pinion 292. The crown rack pinion 292 may be rotatably coupled to posterior knob 220. Accordingly, rotating posterior knob 220 engages crown rack pinion 292, which in turn engages crown racks 216 to adjust a crown circumference. Rotating knob 220 in a first direction may decrease a length of the left and right crown racks passing through the housing to increase a crown circumference, while rotating knob 220 in a second direction may increase a length of the left and right crown racks passing through the housing to decrease a crown circumference.

The anterior crown band 214 may wrap around an anterior of a user's crown when the HMD device 200 is worn on the user's head. Posterior ends of the anterior crown band 214 may be attached at left and right sides of HMD device 200 via side fasteners 231 to anterior ends of the left and right adjustable crown bands 210, 212. Anterior crown band 214 may include sliding structures 116, and eye relief rack housing 270 mounted at an anterior end of HMD device 200. As crown circumference is increased, the position of attachment structures 140 may be moved in an anterior direction co-linear with the anterior crown band 214. As crown circumference is decreased, the position of attachment structures 140 may be moved in a posterior direction co-linear with the anterior crown band 214. Further still, when crown circumference is decreased, a radius of curvature of the anterior crown band 214 a radius of curvature of the left and right adjustable crown bands 210, 212 may decrease as the anterior crown band 214 and the left and right adjustable crown bands 210, 212 are increasingly bent to conform to a smaller crown circumference. Further still, when crown circumference is increased, a radius of curvature of the anterior crown band 214 a radius of curvature of the left and right adjustable crown bands 210, 212 may increase as the anterior crown band 214 and the left and right adjustable crown bands 210, 212 are decreasingly bent to conform to a larger crown circumference.

HMD device 200 may further comprise left and right eye relief bands 250, 252 that extend anteriorly from left and right sides of HMD device 200, wrapping around the anterior crown band 214, and passing through and overlapping inside eye relief rack housing 230. Eye relief rack housing 230 may comprise a notch 272 at a proximal center surface as well as openings 264 at distal left and right surfaces. Openings 264 may be positioned opposite from sliding structures 262 extending from anterior crown band 214. Openings 264 and notch 272 may aid in increasing flexibility of the eye relief rack housing 230, which may increase conformity and fit of the anterior crown band 214 to a user's crown. Furthermore, openings 264 may allow sliding structures 262 to slidably engage the left and right eye relief bands 250, 252. As shown in FIGS. 6-9, Anterior crown band 214 may further include cutouts (similar to cutouts 114) for increasing a flexibility and reducing a weight of anterior crown band 214.

Referring to FIGS. 7-9, a side view, a sectional view taken at section 8-8 of FIG. 6, and an anterior cutaway view of HMD device 200, respectively, are illustrated. In particular, FIG. 9 illustrates an anterior view of HMD device 200 with the eye relief rack housing 270 cutaway. Left and right eye relief bands 250, 252 may include left and right eye relief racks 280, 282, respectively. As shown via the cutaway section 299, wherein the right eye relief rack 282 is partially cutaway to reveal the left eye relief rack 280, left and right eye relief racks 280, 282 may overlap inside the eye relief rack housing 270. Left and right eye relief racks may be engaged to pinion 290 wherein rotational motion of pinion 290 actuates linear motion of the left and right eye relief racks in opposite linear directions aligned with the anterior crown band 214. Pinion 290 may be positioned at a central anterior location of the anterior crown band 214, and may be mounted to pinion base 294 to maintain the central anterior location of the pinion 290 even when it is rotating. Pinion base 294 may be mounted to eye relief rack housing 270. As such, applying a pushing or pulling force to the display toward or away from a user's crown when the HMD is worn on a user's crown may initiate sliding of the left and right eye relief racks and rotation of the pinion 290 in a timed manner such that an eye relief distance 3792 is decreased or increased, respectively. In particular, applying a pushing force to the display assembly 3790 may initiate rotation of pinion 290 in a first direction to slide left and right eye relief racks 280, 282 wherein a length of the left and right eye relief racks 280, 282 overlapping inside eye relief rack housing 270 may be increased in the timed manner. Furthermore, applying a pulling force to the display assembly 3790 may initiate rotation of pinion 290 in a second direction to slide left and right eye relief racks 280, 282 wherein a length of the left and right eye relief racks 280, 282 overlapping inside eye relief rack housing 270 may be decreased in the timed manner.

Left and right eye relief bands 250, 252 may further comprise attachment structures 140 mounted at posterior ends of the left and right eye relief bands 250, 252. Attachment structures 140 may comprise a plurality of mounting holes to which armature 3750 may be mounted. In other examples, attachment structures may comprise hooks, clips, rivets, screw, and other attachment mechanisms. The armature supports and affixes a display assembly 3790 to the HMD device 100, the display assembly 3790 mounted at left and right sides to respective distal ends 3756 of the left and right arms 3752, 3754. In this way, upon application of a pushing force towards or a pulling force away from the user's eyes to the display assembly 3790, an eye relief distance of display assembly 3790 may be adjusted in a timed manner relative to the left and right sides. Furthermore, the adjusting the eye relief distance may comprise of adjusting a length of the left and right eye relief bands 250, 252 passing through and overlapping inside eye relief rack housing 270; since the left and right eye relief bands 250, 252 are grounded to the eye relief rack housing 270 and are not grounded to the crown rack housing 230, left and right eye relief bands 250, 252 do have to be adjusted to compensate for adjustments in crown circumference in order to maintain an eye relief distance 3792.

Left and right eye relief bands 250, 252 may be held adjacent to a distal surface of the anterior crown band 214 by sliding structures 116 and sliding structures 262. Thus, attachment structures 140 translate in a linear direction anteriorly and posteriorly adjacent to the distal surface of the anterior crown band 214 as the eye relief distance 2792 is increased and decreased, respectively. Furthermore, sliding structures 116, sliding structures 262, and eye relief rack housing 270 may aid in encouraging left and right eye relief bands 250, 252 to bend and conform to the shape of the anterior crown band 214 as crown circumference is increased and decreased, and as eye relief distance is adjusted. Further still, the elasticity of the anterior crown band 214, left and right eye relief bands 250, 252, and the left and right adjustable crown bands 210, 212 may cause the bent left and right eye relief bands 250, 252 to continually press against the sliding structures 116 and 262. In this way, a position (e.g. eye relief distance 3792) of the left and right eye relief bands 250, 252 may be maintained by a friction force between the left and right eye relief bands 250, 252 and the anterior crown band 214. Furthermore, frictional forces between the engaged gears of the pinion 290 and left and right eye relief racks 280, 282 may aid in maintaining a position (e.g. eye relief distance 3792) of the left and right eye relief bands 250, 252. Further still, frictional forces between the engaged gears of crown rack pinion 292 and left and right crown racks 216 may aid in maintaining a position (e.g. crown circumference) of the left and right adjustable crown bands 210, 212.

As shown in FIG. 9, HMD device 200 may further comprise a curved housing posterior support band 136 with cutouts 138, and a curved anterior crown support 236 with cutouts 238. Both anterior and posterior crown supports 236, 136 may aid in providing a comfortable fit of HMD device 200 to a user's crown. Cutouts 238, 138 may aid in increasing a flexibility of the anterior and posterior crown supports 236, 136 and may aid in reducing a weight of the HMD device 200. Thus HMD device 200 may comprise a crown band adjustment mechanism, including left and right adjustable crown bands 210, 212 and crown racks 216 mounted at posterior ends thereof, crown rack housing 230, knob 220, and crown rack pinion 292. Furthermore, HMD device 200 may comprise an eye relief distance adjustment mechanism configured to move the left and right arms 3752, 3754 in a timed manner toward and away from the crown band along a substantially linear path, to thereby adjust an eye relief distance from the display to an eye of the user when the crown band is fitted on the crown of the user. Further still, in this way, eye relief distance may be adjusted independently of crown circumference. In other words, adjusting crown circumference may be performed without any or with reduced compensating adjustment for eye relief distance and vice versa.

Figure 12:
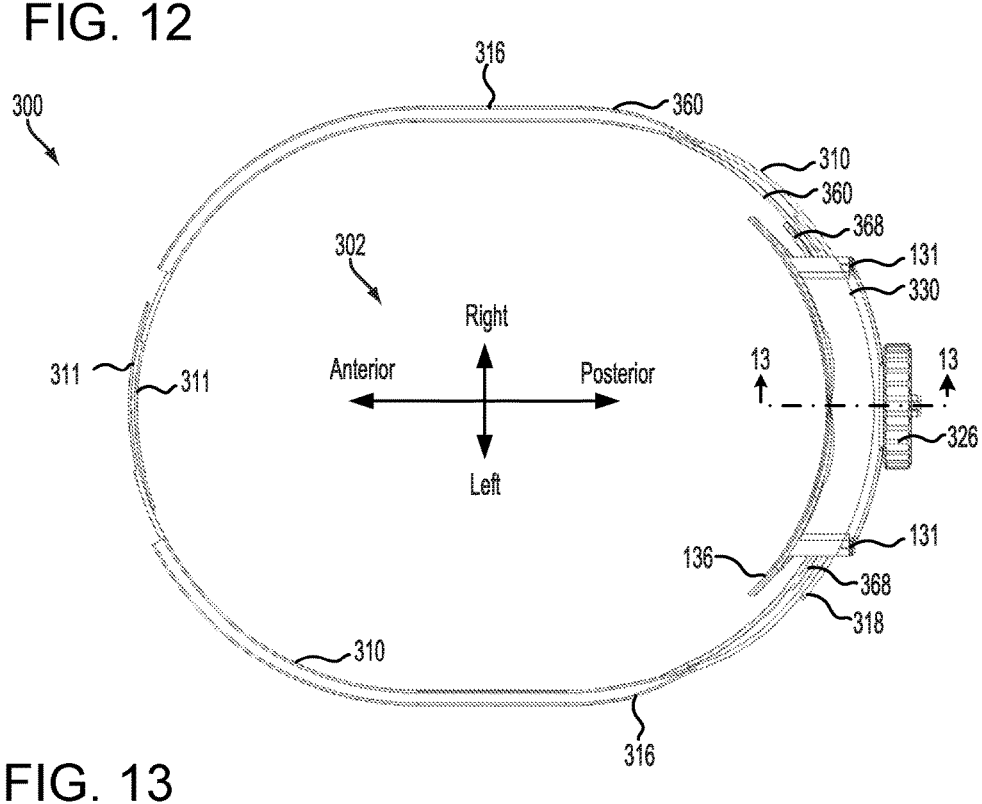
FIG. 12 is a plan view of HMD device of FIG. 10

Turning now to FIGS. 10 and 12, rear perspective and plan views of a third example embodiment of an HMD device 300 are illustrated. Also shown in FIGS. 10 and 12 are axes 303 and 302 indicating anterior, posterior, left, right, dorsal, and ventral directions. An HMD may include HMD device 300 to be worn by a user, the HMD device 300 comprising an adjustable crown band 310. The circumference of the adjustable crown band 310 may be adjusted by a crown band circumference adjusting mechanism coupled to the adjustable crown band, the crown band circumference adjusting mechanism configured to adjust a circumference of the crown band to releasably secure the crown band to the crown of the user. In the example embodiment shown in FIGS. 10-13, the crown band circumference adjusting mechanism comprises the adjustable crown band 310, outer knob 326, rack housing 330, and crown racks 318. By rotating the outer knob 326 in a first or second direction, crown racks 318 may be driven to either increase or decrease the circumference of the adjustable crown band 310, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 300 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 10-13, the eye relief distance adjustment mechanism comprises left and right eye relief bands 360, inner knob 322, rack housing 330, eye relief racks 368, attachment structures 140, and sliding structures 116. By rotating inner knob 322 in a first or second direction, eye relief racks 268 may be driven to move the attachment structures 140 (along with the armature 3750 and display assembly 3790) in a timed manner anteriorly or posteriorly, respectively, along the distal surface of the adjustable crown band 310 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

HMD device 300 comprises a flexible adjustable crown band 310 that wraps around the posterior of a user's crown when HMD is worn on by a user, and may be adjusted to accommodate a wide range of head circumferences via a knob assembly 320 located at a posterior center of the HMD device 300. Adjustable crown band 310 also extends anteriorly, wrapping around an anterior end of a user's crown when the HMD device 300 is worn. Left and right anterior ends 311 of adjustable crown band may overlap at an anterior side of HMD device 300, and may be coupled via fasteners 312. In other examples, left and right anterior ends 311 of adjustable crown band may form a unitary and contiguous band at an anterior side of HMD device 300.

Adjustable crown band 310 may include sliding structures 316, extending substantially across left and right sides of the adjustable crown band 310. Sliding structures 316 may extend distally from dorsal and ventral edges of adjustable crown band 310, and sliding structures 316 may include lips 317 which extend ventrally and distally from dorsal and ventral edges of adjustable crown band 310. In the example embodiment of FIG. 10, sliding structures 316 comprise rails along the edges of adjustable crown band 310; however, sliding structures 316 may comprise loops, bands, clips or other structures that guide and facilitate sliding of the eye relief bands 360 adjacent to a distal surface of the adjustable crown band 310 in a substantially linear direction aligned with the adjustable crown band 310.

Anterior ends of eye relief bands 360 wrap around a distal (e.g. outer) surface of the adjustable crown band 310 extending from an anterior side and extending along left and right sides. As described above sliding structures 316 retain eye relief bands 360 adjacent to a distal surface of adjustable crown band 310. Accordingly, eye relief bands 360 bend and conform to a curvature and general shape of the adjustable crown band 310. Eye relief bands 360 further comprise one or more attachment structures 140 positioned near anterior ends of the eye relief bands 360. The attachment structures may comprise holes, protrusions, clips, couplings, braces, and other structures to which left and right arms 3752, 3754 of an armature 3750 may be attached. Accordingly, a display assembly 3790 may be supported and affixed via the armature 3750 to the HMD device 100, the display assembly 3790 mounted at left and right sides to respective distal ends 3756 of the left and right arms 3752, 3754 of the armature 3750. HMD device 300 may further comprise holes 319 on a proximal anterior side of adjustable crown band 310 and may aid in assembly and mounting of the armature 3750 via attachment structures 140.

On posterior left and right sides of the HMD device 300, the eye relief bands 360 may pass through openings 340 in the adjustable crown band 310. Openings 340 may be located on left and right sides of the adjustable crown band 310, and the openings 340 may comprise a channel, slot, or other type of opening, shaped to guide the eye relief bands 360 from a distal (outer) surface to a proximal (inner) surface of the adjustable crown band 310. The shape of opening 340 may aid in smoothly guiding the eye relief bands 360 to reduce kinking or abrupt transitions in the curvature of the eye relief bands 360, thereby maintaining comfort-of-fit of the HMD device 300 when worn by a user. After passing through openings 340, the eye relief bands 360 may pass through and overlap inside rack housing 330 mounted at a posterior end of HMD device 300. In this way, eye relief bands 360 are positioned between a posterior crown of the user and the adjustable crown bands 310 when HMD device 300 is worn by the user. Passing the eye relief bands 360 through to an interior (proximal) side of the adjustable crown bands 310 at a posterior side may aid outer knob 326 in more compactly adjusting the crown bands. Furthermore, designating the outer knob for adjusting the crown circumference aids in the user being able to easily access the crown adjustment mechanism; the crown adjustment mechanism may be more frequently adjusted as compared to the eye relief distance adjustment mechanism.

Figure 13:
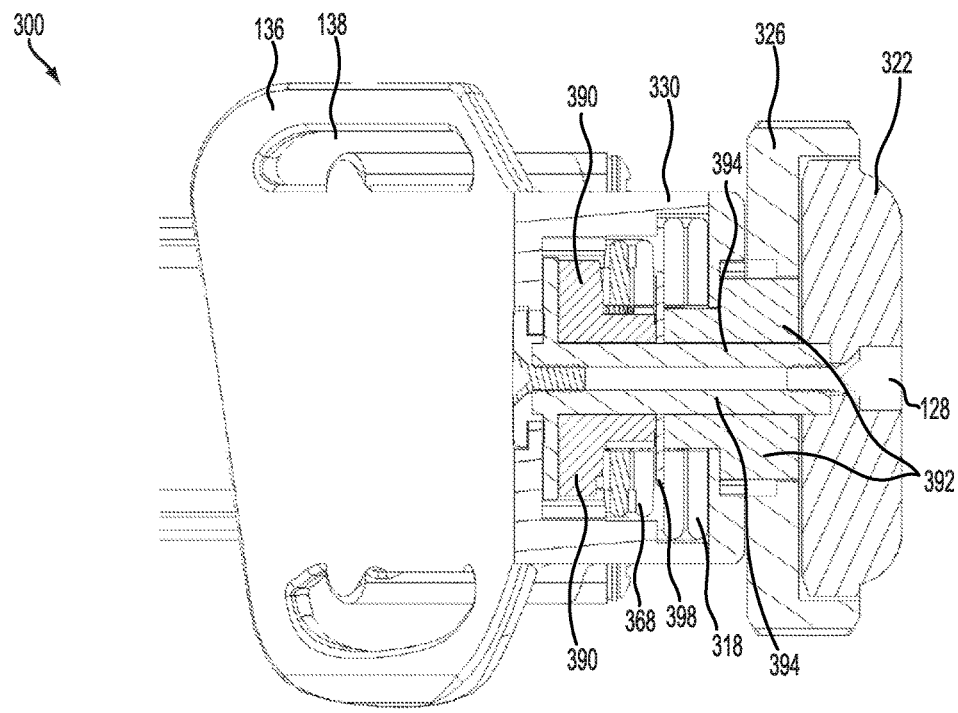
FIG. 13 is a cross-sectional view of HMD device of FIG. 10 taken at section

Referring to FIGS. 11 and 13, a side view and a cross-sectional view taken at section 13-13 of FIG. 12 of HMD device 300 are illustrated. Adjustable crown bands 310 include crown racks 318 mounted at posterior ends of adjustable crown bands 310, and eye relief bands 360 include eye relief racks 368 mounted at posterior ends of eye relief bands 360. Crown racks 318 may pass through and overlap inside rack housing 330, and eye relief racks 368 may pass through and overlap inside rack housing 330. Inside rack housing 330, crown racks 318 may be engaged with a crown rack pinion and ratchet 392 mounted to rack housing 330, while eye relief racks 368 may be engaged to an eye relief pinion and ratchet 390 mounted to rack housing 330. Furthermore divider 398 may separate rack housing 330 into two compartments. Thus, the eye relief racks 368 may pass through and overlap inside an inner compartment of rack housing 330, while crown racks 318 may pass through and overlap inside an outer compartment of rack housing 330. In this way divider 398 may reduce mechanical interference between the crown racks 318 and the eye relief racks 368 inside the housing and thereby aid in increasing smooth operation of the HMD device 300.

HMD device 300 may comprise knob assembly 320. Knob assembly 320 may comprise nested knobs, including outer knob 326 and inner knob 322. Outer knob 326 may be rotatably coupled to crown pinion and ratchet 392; when outer knob 326 is rotated in a first direction, crown pinion and ratchet 392 may engage crown racks 318 and a length of crown racks 318 overlapping in rack housing 330 may increase, thereby reducing a circumference of the HMD device 300. When outer knob is rotated in a second direction, crown pinion and ratchet 392 may engage crown racks 318 and a length of crown racks 318 overlapping in rack housing 330 may decrease, thereby increasing a circumference of the HMD device 300.

Inner knob 322 may be rotatably coupled to eye relief pinion and ratchet 390 via eye relief drive shaft 394; when inner knob 322 is rotated in a first direction, eye relief pinion and ratchet 390 may engage eye relief racks 368 and a length of eye relief racks 368 overlapping in rack housing 330 may increase, thereby reducing an eye relief distance of the HMD device 300. When inner knob 322 is rotated in a second direction, eye relief pinion and ratchet 390 may engage eye relief racks 368 via eye relief drive shaft 394, and a length of eye relief racks 368 overlapping in rack housing 330 may decrease, thereby increasing an eye relief distance of the HMD device 300. Eye relief distance may be adjusted via rotation of inner knob 322 because as the length of the eye relief racks 368 overlapping in rack housing 330 increases or decreases, a position of the attachment structures 140 (to which armature 3750 with display assembly 3790 is mounted) moves linearly aligned with the adjustable crown band 310 in an anterior direction or a posterior direction, respectively, relative to the eyes of the user when the HMD device 300 is worn by the user.

The adjustment for eye relief distance may comprise the adjustment length for the crown circumference, since both the adjustable crown bands 310 and the eye relief bands 360 are grounded to the rack housing 330. As such, when the circumference of the adjustable crown bands 310 is adjusted via outer knob 326, the eye relief bands 360 may also be adjusted via inner knob 322 to maintain the same eye relief distance of the display assembly 3790 and the eyes of the user. Furthermore, because the eye relief racks 368 mounted on the left and right ends of eye relief bands 360 are grounded to the eye relief pinion and ratchet 390, rotation of the eye relief pinion and ratchet 390 actuates translation of the eye relief bands 360 in a timed manner. As such, the eye relief distance 3792 of display assembly 3790 may be adjusted in the timed manner with respect to the left and right sides of the HMD device 300. Further still, because the crown racks 318 mounted on the left and right ends of adjustable crown bands 310 are grounded to the crown adjustment pinion and ratchet 392, rotation of the crown adjustment pinion and ratchet 392 actuates translation of the adjustable crown bands 310 in a timed manner. As such, the crown circumference of HMD device 300 may be adjusted in the timed manner with respect to the left and right sides of the HMD device 300.

Crown pinion and ratchet 392 and eye relief pinion and ratchet 390 may impart a ratcheting capability to HMD device 300. In particular, the ratcheting capability may cause the movement of the adjustable crown bands 310 and the eye relief bands 360 to be non-backdrivable. In other words, the eye relief distance and the crown circumference may not be adjusted without rotation of the inner knob 322 and the outer knob 326, respectively. In particular, the crown pinion and ratchet 392 and the eye relief pinion and ratchet 390 may not be rotated by only applying a pushing or pulling force on the display assembly 3790. Furthermore, the crown pinion and ratchet 392 and the eye relief pinion and ratchet 390 may be locked by the ratcheting properties thereof, until rotation of the inner knob 322 and the outer knob 326, respectively, are initiated. The non-backdrivable nature of HMD device 300 may be advantageous because a particular eye relief distance and a particular crown fit (e.g., crown circumference) of the HMD device 300 may be maintained between multiple doffs and dons of the HMD. As such a user may use the HMD, remove the HMD while performing other activities, and then return to use the HMD again, without fear of the HMD fit or eye relief distance having changed. The non-backdrivable nature of HMD device 300 thus increases a user-friendliness of the HMD, and may reduce a user setup time associated with the HMD. Furthermore, the crown band circumference adjusting mechanism and the eye relief distance adjustment mechanism of HMD device 300 may be advantageous because both eye relief distance and crown circumference may be adjusted independently of one another at a single (central posterior) position on the HMD device 300.

Figure 18:
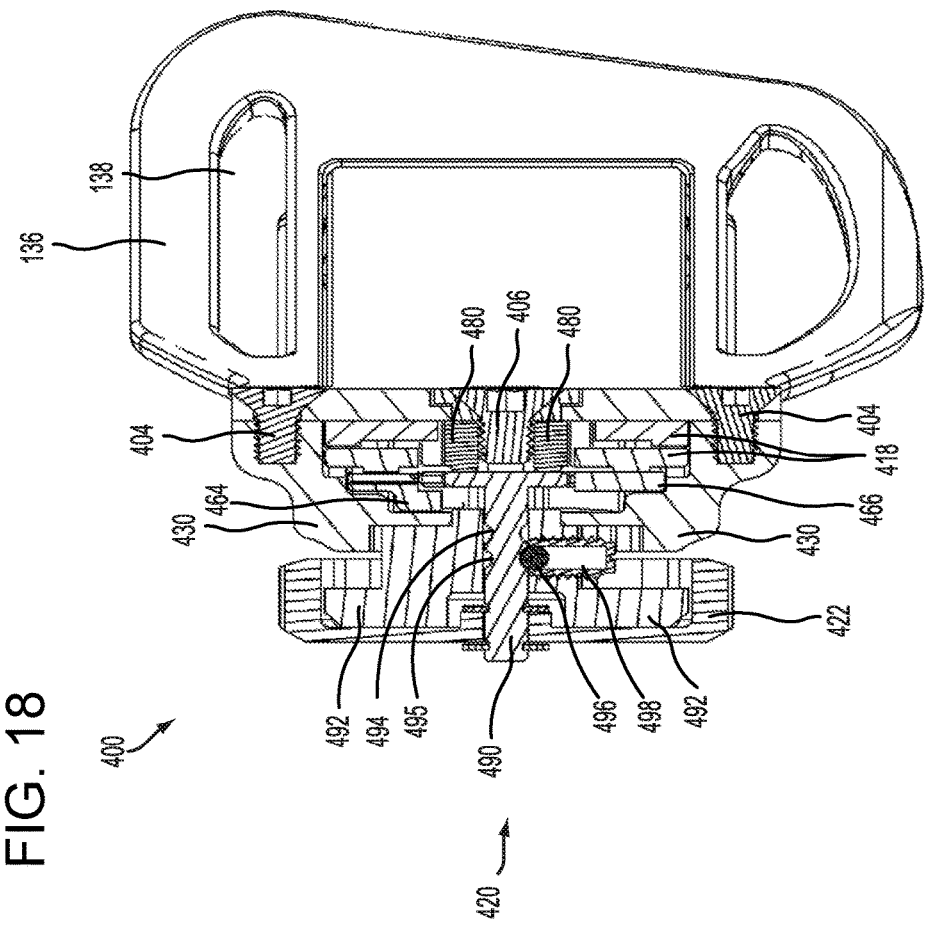
FIG. 18 is a cross-sectional view of the HMD device of FIG. 14 taken at section 18-18.
Figure 17:
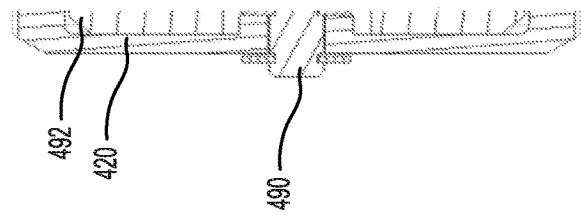
FIG. 17 is a partial cross-sectional view of the HMD device of FIG. 14 taken at section 17-17.

Turning now to FIGS. 14, 14A, 15, and 16, posterior perspective, partial anterior exploded perspective, left side, posterior views are illustrated of a fourth example embodiment of an HMD device 400. Furthermore, FIGS. 17, 18, and 18A illustrate partial cross-sectional views and a partial exploded perspective view of a fourth example embodiment of an HMD device 400. An HMD may include HMD device 400 to be worn by a user, the HMD device 400 comprising left and right adjustable crown bands 410. The circumference of the left and right adjustable crown bands 410 may be adjusted by a crown band circumference adjusting mechanism coupled to left and right adjustable crown bands 410, the crown band circumference adjusting mechanism configured to adjust a circumference of the crown band to releasably secure the crown band to the crown of the user. In the example embodiment shown in FIGS. 14, 14A, 15-18, and 18A, the crown band circumference adjusting mechanism comprises the left and right adjustable crown bands 410, shiftable knob 422, housing 430, timing band 460, timing band crown racks 466, first and second anterior crown racks, and first and second posterior crown racks 418. By shifting shiftable knob 422 to a first indexed position, and by rotating the shiftable knob 422 in a first or second direction, first and second posterior crown racks 466 may be driven by pinion 490 and first and second anterior crown racks may be driven by timing band 460 to either increase or decrease the circumference of the adjustable crown band 410, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 400 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 14, 14A, 15-18, and 18A, the eye relief distance adjustment mechanism comprises left and right adjustable crown bands 410, timing band 460, shiftable knob 422, housing 430, timing band eye relief racks 462 and 464, timing band crown racks 466, attachment structures 140, and sliding structures 116. By shifting shiftable knob 422 to a second indexed position, and by rotating the shiftable knob 422 in a first or second direction, timing band eye relief racks 462 and 464 and timing band crown racks 466 may be driven by timing band 460 to move the attachment structures 140 (along with the armature 3750 and display assembly 3790) in a timed manner anteriorly or posteriorly, respectively, along the distal surface of the adjustable crown band 410 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

Figure 14:
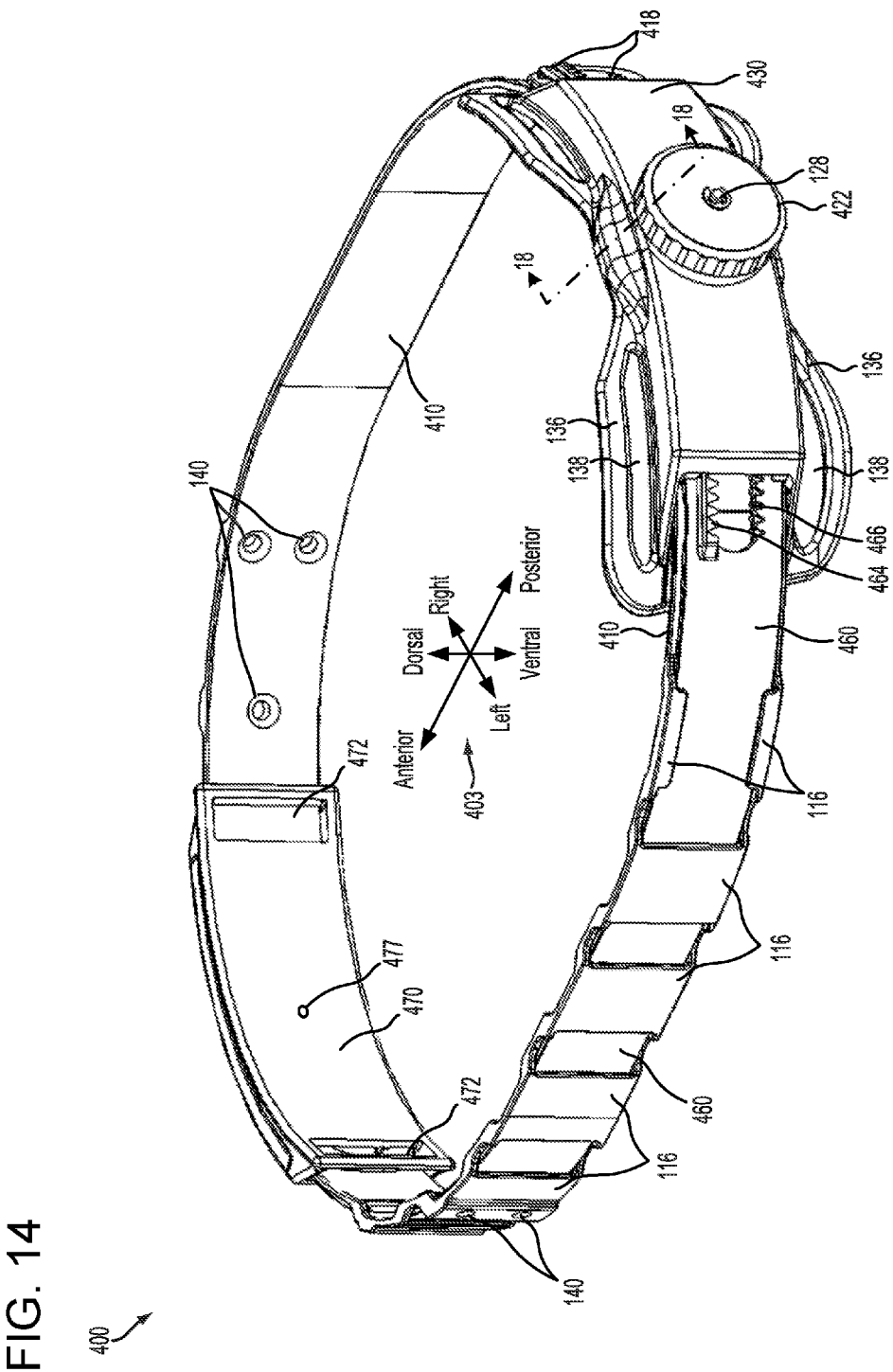
FIG. 14 is a posterior perspective view of an illustrative example of an HMD device in accordance with a fourth embodiment of the present disclosure.
Figure 14A:
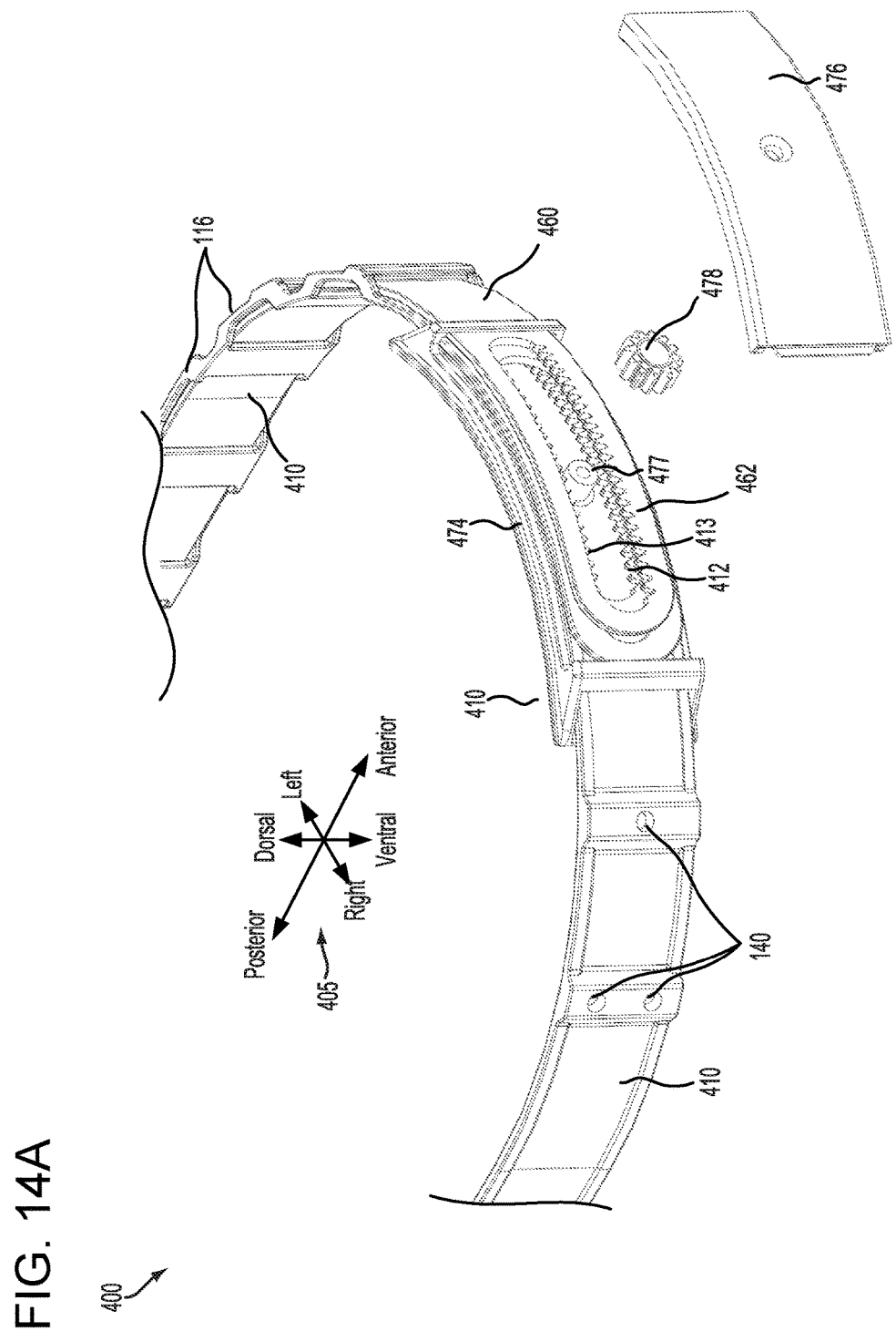
FIG. 14A is a partial anterior exploded perspective view of the HMD device of FIG. 14.

FIGS. 14 and 14A includes axes 403 and 405 respectively, showing anterior, posterior, dorsal, ventral, left, and right directions. HMD device 400 comprises left and right flexible crown bands 410 that wrap around the left and right side, respectively, of a user's crown when HMD device 400 is worn by the user. Each of left and right crown bands 410 may each comprise first and second anterior racks 412, 413 mounted at an anterior end and first and second posterior racks (not shown) mounted at a posterior end. HMD device 400 may further comprise a timing band 460 that wraps around a left side of the HMD device. Timing band 460 includes an anterior timing band eye relief adjustment rack 462 mounted at an anterior end of the timing band 460, and a posterior timing band crown rack 466 and a posterior timing band eye relief rack 464 mounted at a posterior end of the timing band 460. The anterior timing band eye relief adjustment rack 462, posterior timing band eye relief adjustment racks 464, and posterior timing band crown adjustment racks 466 may be shifted in an anterior-posterior axis relative to the anterior and posterior timing band eye relief adjustment racks in the HMD device 400. Furthermore, the anterior and posterior timing band crown adjustment racks and the anterior and posterior timing band eye relief adjustment racks may be positioned on opposite (e.g., dorsal and ventral, or ventral and dorsal) sides relative to the posterior pinion 490. In this way, when posterior pinion 490 is rotated in a first direction while engaging anterior and posterior timing band crown adjustment racks the timing band may be driven in an opposite direction from when posterior pinion 490 is rotated in the first direction while engaging the anterior and posterior timing band eye relief adjustment racks.

The first and second anterior racks e.g., 412, 413 of FIG. 14A of the left and right crown bands 410, and the anterior timing band eye relief adjustment rack 462 may be engaged to an anterior pinion 478 mounted at and rotatably coupled to anterior housing 470 via anterior pinion axle 477. Anterior housing 470 may include an anterior housing rear cover 474 and an anterior housing front cover 476. As shown in FIG. 14A, the left and right crown bands 410 and the timing band 460 may pass through left and right openings in the anterior housing rear cover 474. Anterior housing front cover 476 may be removably affixed to an anterior side of the anterior housing rear cover 474, thereby retaining anterior pinion 478, first and second anterior racks 412, 413 of the left and right crown bands, and eye relief adjustment racks engaged within anterior housing 470. The first and second posterior crown racks 418 of left and right crown bands, the posterior timing band crown racks 466, and the posterior timing band eye relief racks 464 may be engaged to a posterior pinion 490 mounted at and rotatably coupled to posterior housing 430. In this way: first anterior rack of the left crown band and first anterior rack of the right crown band may pass through and overlap inside anterior housing 470; second anterior rack of the left crown band and second anterior rack of the right crown band may pass through and overlap inside anterior housing 470; first posterior rack of the left crown band and first posterior rack of the right crown band may pass through and overlap inside posterior housing 430; and second posterior rack of the left crown band and second posterior rack of the right crown band may pass through and overlap inside posterior housing 430.

A shiftable knob assembly 420 may be mounted to posterior housing 430 at a central posterior position of HMD device 400. FIG. 18 illustrates a cross-sectional view of HMD device 400 taken at section 18-18 of FIG. 14. Shiftable knob assembly 420 may comprise a shiftable knob 422, which may be rotatably coupled to posterior pinion 490. As such, upon rotation, the shiftable knob assembly 420 may drive posterior pinion 490. Posterior pinion 490 may comprise posterior and anterior grooves 494, 495 encircling a circumference of posterior pinion 490 at adjacent axial positions. Furthermore, shiftable knob assembly 420 may also translate or shift in the anterior-posterior axis to occupy one of at least two indexed positions corresponding to the posterior and anterior grooves 494, 495. The positioning of shiftable knob assembly 420 may be indexed via a ball detent 496 residing in a ball detent chamber 498 adjacent to the posterior pinion 490. A diameter and shape of the ball detent may correspond to a diameter and shape of the posterior and anterior grooves 494, 495, such that when the posterior pinion is shifted to one of the at least two indexed positions, ball detent 496 is seated in one of the posterior and anterior grooves 494, 495 and partially protrudes from ball detent chamber 498.

Ball detent 496 may be urged to partially protrude from ball detent chamber 498 in a dorsal direction by a spring or other elastic member contained within ball detent chamber 498. When the shiftable knob assembly 420 is shifted between the posterior or anterior axial indexed position, the protruding ball detent 496 is first pushed into the ball detent chamber 498, the spring or elastic material therein being compressed by the ungrooved portion of the posterior pinion between posterior and anterior grooves 494, 495, which allows the posterior pinion 490 to be shifted. When the posterior pinion 490 has shifted so that one of the posterior and anterior grooves 494, 495 is aligned or partially aligned with the ball detent chamber 498, ball detent 496 seats in the aligned groove, and the posterior pinion 490 shifts to the corresponding indexed position.

When posterior pinion 490 is shifted to a first indexed position, (e.g. ball detent 496 is positioned in anterior groove 495, as shown in FIG. 18), the HMD device 400 may be configured to adjust a crown circumference. When adjusting crown circumference, ball detent 496 may be seated in the anterior groove 495, and posterior pinion 490 may be positioned to drive a stationary pinion 480. Furthermore, stationary pinion 480 may be engaged to drive first and second posterior crown racks 418 of the left and right crown bands when shiftable knob 422 is rotated. Further still, when posterior pinion 490 is shifted to a first indexed position, posterior pinion 490 may engage the posterior timing band crown rack 466.

Thus, in one example embodiment, rotating shiftable knob 422 may drive rotation of the posterior pinion 490, which in turn drives translation of the timing band 460 via timing band crown racks 466. The translation of the timing band 460 via crown racks 466 may drive rotation of the anterior pinion 478 mounted to the anterior housing 470 such that the first and second anterior racks of left and right crown bands are adjusted to increase or decrease a circumference of HMD device 400. In particular, the first and second anterior racks of the left and right crown bands and the first and second posterior crown racks 418 of the left and right crown bands may be adjusted in a timed manner via timing band 460 to increase or decrease a circumference of HMD device 400, while maintaining an eye relief distance 3792. Specifically, lengths of first and second anterior racks of the left and right crown bands passing through and overlapping inside the anterior housing 470 may increase in a timed manner via timing band 460 while lengths of first and second posterior crown racks 418 of the left and right crown bands passing through and overlapping inside the posterior housing 430 increase in the timed manner via timing band 460. Furthermore, lengths of first and second anterior racks of the left and right crown bands passing through and overlapping inside the anterior housing 470 may decrease in a timed manner via timing band 460 while lengths of first and second posterior crown racks 418 of the left and right crown bands passing through and overlapping inside the posterior housing 430 decrease in the timed manner via timing band 460. Because the first and second posterior crown racks 418 of the left and right crown bands are adjusted in a corresponding timed manner with the adjustment of the first and second anterior racks of the left and right crown bands, eye relief distance is maintained approximately constant while the crown circumference is adjusted. Accordingly, when a shiftable knob 422 is shifted to the first indexed position and rotated in either a first or second direction, a circumference of the HMD device 400 may be adjusted (e.g., increased or decreased) to fit a user's crown, while maintaining an eye relief distance.

In another example embodiment, adjustment of the crown circumference may be performed by disengaging the posterior timing band eye relief adjustment racks 464 when posterior pinion 490 is shifted to a first indexed position. Thus, when posterior pinion is 490 rotated, timing band 460 and anterior timing band eye relief adjustment rack 462 remain static in relation to 116. Furthermore, anterior pinion 478, and the first and second anterior racks of left and right crown bands also remain stationary. Thus, adjustment of the crown circumference may be performed via adjustment of the first and second posterior crown racks 418 (and not via adjustment of the first and second anterior racks 412, 413 of the left and right crown bands 410) by rotating shiftable knob 422, and thereby driving rotation of the posterior pinion 490.

When posterior pinion 490 is shifted (e.g. anteriorly relative to the first indexed position) to a second indexed position, the HMD device 400 may be configured to adjust an eye relief distance. When adjusting eye relief distance, ball detent 496 may be seated in the posterior groove 494, and posterior pinion 490 may be positioned to drive timing band eye relief rack 464. Furthermore, posterior pinion may remain rotationally coupled to stationary pinion 480 via a keyed clutch 492 (see FIGS. 18, 18A). Further still, when posterior pinion 490 is shifted to the second indexed position, posterior pinion 490 may engage the posterior timing band eye relief rack 464. Thus, rotating shiftable knob 422 may drive rotation of the posterior pinion 490, which in turn drives translation of the timing band 460 via timing band eye relief racks 464. The translation of the timing band 460 (e.g., timing band 460 slides relative to sliding structures 116) via eye relief racks 464 may drive rotation of the anterior pinion 478 mounted to the anterior housing 470 via anterior timing band eye relief adjustment rack 462 such that the first and second anterior racks of left and right crown bands are adjusted to increase or decrease an eye relief distance of HMD device 400. In particular, the first and second anterior racks of the left and right crown bands and the first and second posterior crown racks 418 of the left and right crown bands may be adjusted in a timed manner via timing band 460 to increase or decrease an eye relief distance 3792 of HMD device 400, while maintaining a crown circumference. Specifically, lengths of first and second anterior racks of the left and right crown bands passing through and overlapping inside the anterior housing 470 may decrease in a timed manner via timing band 460 while lengths of first and second posterior crown racks 418 of the left and right crown bands passing through and overlapping inside the posterior housing 430 may increase in the timed manner via timing band 460. Furthermore, lengths of first and second anterior racks of the left and right crown bands passing through and overlapping inside the anterior housing 470 may increase in a timed manner via timing band 460 while lengths of first and second posterior crown racks 418 of the left and right crown bands passing through and overlapping inside the posterior housing 430 may decrease in the timed manner via timing band 460. Accordingly, when a shiftable knob 422 is shifted to the second indexed position and rotated in either a first or second direction, an eye relief distance of the HMD device 400 may be adjusted (e.g., increased or decreased), while maintaining a circumference of the HMD device 400 to maintain fit to a user's crown.

When posterior pinion 490 is shifted (e.g. anteriorly relative to the first indexed position) to a second indexed position, and the HMD device 400 may be configured to adjust an eye relief distance, a position of attachment structures 140 may be translated in an anterior or posterior direction to increase or decrease eye relief distance, respectively. When posterior pinion 490 is shifted (e.g. posteriorly, as shown in FIG. 18) to the first indexed position, and the HMD device 400 may be configured to adjust a circumference, a position of the attachment structures 140 in an anterior-posterior axis remains constant. Accordingly, depending on whether posterior pinion 490 is shifted to the first or second indexed position, the posterior pinion 490 engages with either the timing band crown adjustment racks or the timing band timing band eye relief adjustment racks respectively, to change a drive direction of the timing band relative to a rotation direction of the shiftable knob 422.

Posterior pinion 490 and stationary 480 may impart a ratcheting capability to HMD device 400. In particular, the ratcheting capability may cause the movement of the left and right adjustable crown bands 410 and the timing band 460 to be non-backdrivable. In other words, the eye relief distance and the crown circumference may not be adjusted without rotation of the shiftable knob 422. In particular, the posterior pinion 490 and the anterior pinion 478 may not be rotated by only applying a pushing or pulling force on the display assembly 3790. Furthermore, the posterior pinion 490 and the anterior pinion 478 may be locked by the ratcheting properties thereof, until rotation of the shiftable knob 422 is initiated. The non-backdrivable nature of HMD device 400 may be advantageous because a particular eye relief distance and a particular crown fit (e.g., crown circumference) of the HMD device 400 may be maintained between multiple doffs and dons of the HMD. As such a user may use the HMD, remove the HMD while performing other activities, and then return to use the HMD again, without fear of the HMD fit or eye relief distance having changed. The non-backdrivable nature of HMD device 400 thus increases a user-friendliness of the HMD, and may reduce a user setup time associated with the HMD. Furthermore, the crown band circumference adjusting mechanism and the eye relief distance adjustment mechanism of HMD device 400 may be advantageous because both eye relief distance and crown circumference may be adjusted at a single (central posterior) position on the HMD device 300, using a single knob assembly. Further still HMD device 400 reduces the total number of bands which may reduce the complexity of operation, and reduce a weight of HMD device 400.

Figure 20:
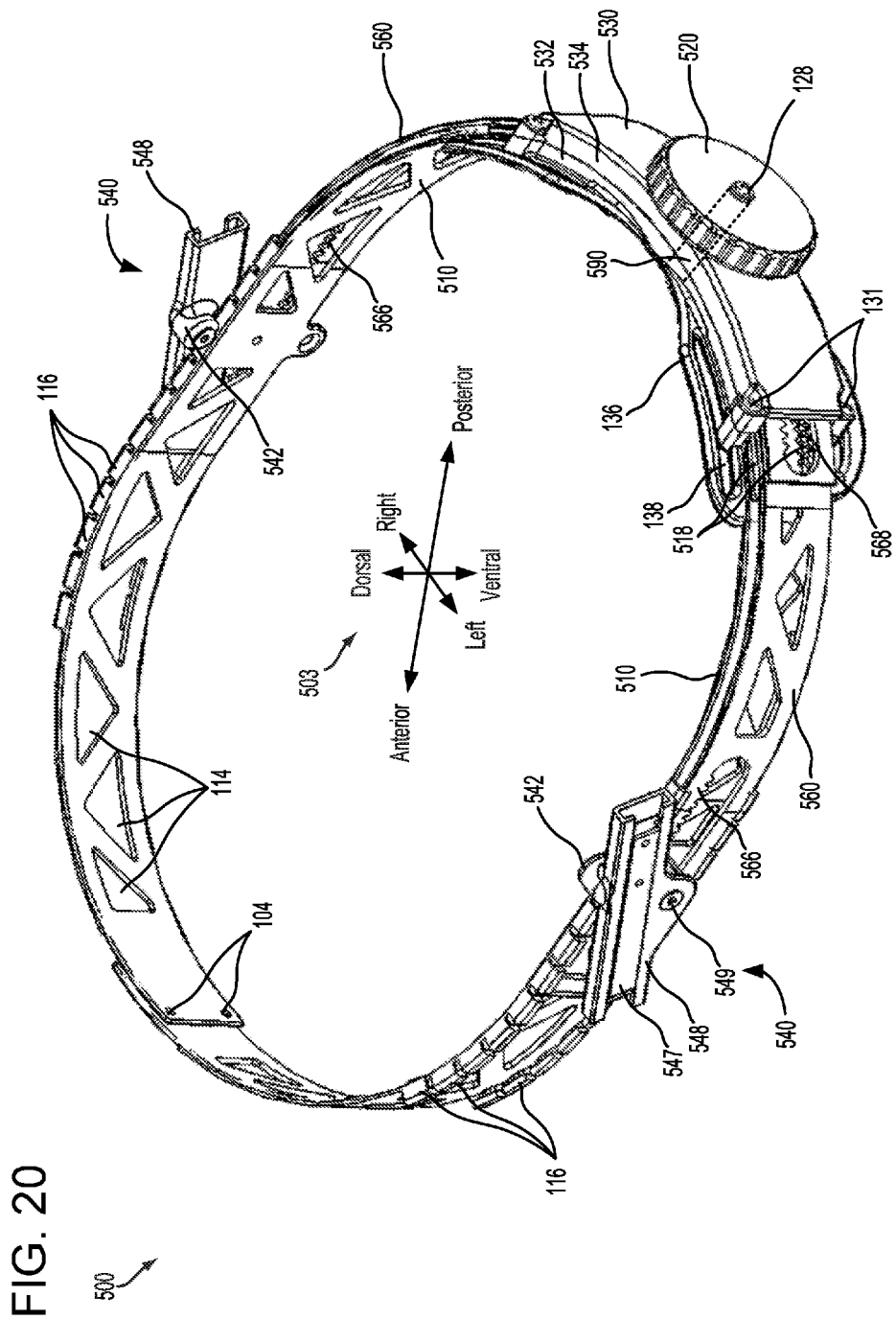
FIG. 20 is a posterior perspective view of the HMD device of FIG. 19.
Figure 23:
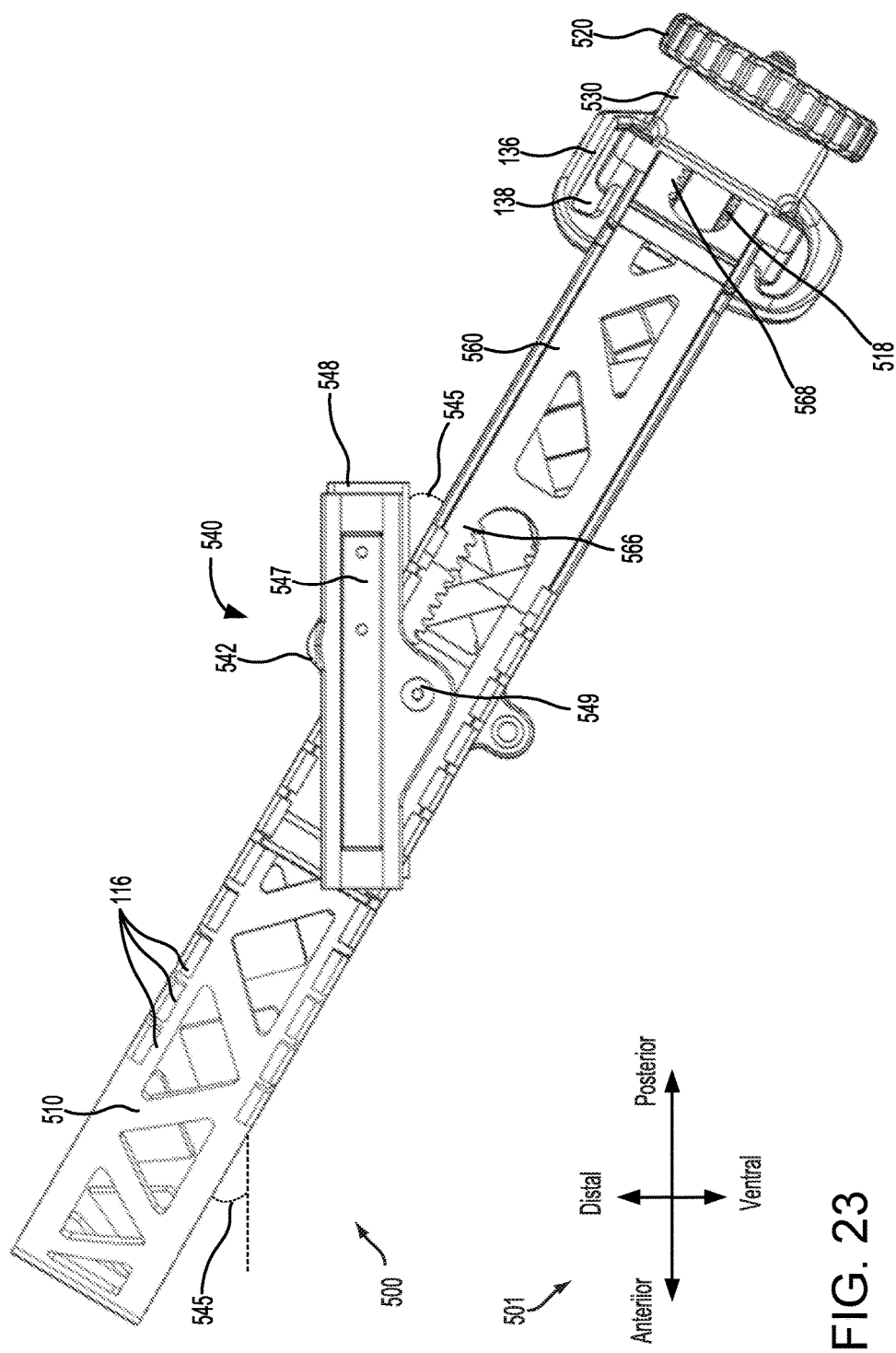
FIG. 23 is a side view of HMD device of FIG. 19.

Turning now to FIGS. 19, 20, and 23, posterior perspective, plan, and side views respectively of a fifth embodiment of an HMD device 500 are illustrated. An HMD may include HMD device 500 to be worn by a user, the HMD device 500 comprising a flexible adjustable crown band 510. The circumference of the adjustable crown band 510 may be adjusted by a crown band circumference adjusting mechanism coupled to the adjustable crown band 510, the crown band circumference adjusting mechanism configured to adjust a circumference of the crown band to releasably secure the crown band to the crown of the user. In the example embodiment shown in FIGS. 19-23, the crown band circumference adjusting mechanism comprises the adjustable crown band 510, knob 520, housing 530, timing bands 560, and crown racks 518. By rotating the knob 520 in a first or second direction, the crown racks 418 may be driven to either increase or decrease the circumference of the adjustable crown band 510, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 500 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 19-23, the eye relief distance adjustment mechanism comprise adjustable crown band 510, timing bands 560, knob 520, housing 530, timing band racks 568, attachment structures 540, and sliding structures 116. By rotating the knob 520 in a first or second direction, timing band racks 568 may be driven to move the attachment structures 540 (along with the armature 3750 and display assembly 3790) in a timed manner anteriorly or posteriorly, respectively, along the distal surface of the adjustable crown band 510 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

As illustrated in FIGS. 19, 20, and 23, axes 501, 502, and 503 illustrate anterior, posterior, dorsal, ventral, left, and right directions. When HMD device 500 is worn by a user, flexible adjustable crown band 510 wraps around the user's crown at an angle 545 raised from the anterior-posterior axis. In one example angle 545 may be less than 35°, but greater than 10°. In particular, angle 545 may be approximately 30°. If angle 545 is greater than 35°, achieving a comfortable crown fit of HMD device 500 may be reduced. In this way, the HMD may be worn higher on a user's head, while maintaining an adjustment of the eye relief distance substantially in an anterior-posterior direction. At the posterior side of HMD device 500, ends of adjustable crown band 510 pass through and overlap inside housing 530. Adjustable crown band 510 may comprise crown racks 518 mounted to the ends of the adjustable crown band 510. Thus, the crown racks 518 may pass through and overlap inside housing 530, and may be engaged to a pinion 590 mounted at housing 530. Pinion 590 may be rotatably coupled to knob 520 such that when knob 520 is rotated in a first or second direction, lengths of the crown racks 518 passing through and overlapping inside housing 530 increase or decrease, respectively, thereby decreasing or increasing a crown circumference, respectively.

Timing bands 560 may wrap around a distal (outer) surface of adjustable crown band 510. Posterior ends of timing bands 560 may comprise timing band racks 568 passing through and overlapping inside housing 530. Housing 530 may comprise an inner housing 532 and an outer housing 534 to separate the crown racks 518 and the timing band racks 568 inside the housing. Accordingly, crown racks 518 may pass through and overlap inside inner housing 532, and timing band racks 568 may pass through and overlap inside outer housing 534. Furthermore, timing band racks 568 may be engaged to a second posterior pinion (not shown) coaxial with pinion 590. Timing band racks 568 may be timed corresponding to second posterior pinion via a friction controlled mechanism. Thus, when knob 520 is rotated in a first or second direction, second posterior pinion may be rotated in a first or second direction, and lengths of the timing band racks 568 passing through and overlapping inside housing 530 may increase or decrease, respectively.

Anterior ends of the timing bands 560 include side racks 566 at left and right sides of the HMD device 500. Side racks 566 may be engaged to attachment structures 540 positioned at left and right sides of HMD device 500. Turning now to FIGS. 21-22, partial side views of HMD device 500 are illustrated. In particular, FIG. 22 shows the partial side view of HMD device 500 of FIG. 21 with eye relief rack holder 548 removed to clearly show an exposed side view of the eye relief rack 547. As shown in FIGS. 21-22, attachment structures 540 may comprise side pinions 549, eye relief racks 547, eye relief rack holders 548, and fasteners 542. Accordingly side racks 566 may be engaged to side pinions 549 of attachment structures 540. Furthermore, rotating knob 520 in a first or second direction may drive side racks 566 to translate posteriorly or anteriorly (at an angle 545) in a timed manner (e.g., synchronized to translate in the same direction at the same time, and at the same rate) along the crown band 510 respectively, which in turn may drive side pinions to rotate in a timed manner such that eye relief racks 547 translate posteriorly or anteriorly in the timed manner, respectively. As described previously, sliding structures 116 may retain timing bands 560 adjacent to the distal (outer) surface of adjustable crown band 510 and may maintain translation of timing bands 560 in a substantially linear direction aligned with adjustable crown band 510. Further still, left and right arms 3752, 3754 of armature 3750 may be mounted to attachment structures 540 at eye relief racks 547. In this way, rotating knob 520 may adjust (e.g., decrease or increase) an eye relief distance 3792 between the users eyes 3794 and the display assembly 3790 in the timed manner relative to the left and right sides. Furthermore, because eye relief rack holders 548 are angled from adjustable crown band 510 at angle 545, eye relief racks 547 slide and translate at an angle 545 to the adjustable crown band 510, and adjustment eye relief distance may thus be maintained in a direction substantially aligned with the anterior-posterior axis even though the adjustable crown band 510 and the crown circumference adjustment are aligned with an axis at angle 545 to the anterior-posterior axis. Fasteners 542 may be configured to adjustably fix eye relief rack holders 548 to be positioned at angle 545 to the adjustable crown band. In some examples, fasteners 542 may be adjusted to adjust (increase and/or decrease) angle 545.

In another example, adjusting the eye relief distance may further comprise applying a pushing force to the display towards the user's eyes or applying a pulling force to the display away from the user's eyes to overcome friction between the side pinions 549, side racks 566, eye relief racks 547, and eye relief rack holders 548. Furthermore, applying the pushing or pulling force to the display may driving timing band racks 568 via the friction-engaged second posterior pinion, but may not drive pinion 590. In this manner, eye relief distance may be adjusted independently from crown circumference. In a further example, a nested knob (analogous to nested knob assembly 320) may be provided in place of knob 520 for adjusting the crown circumference independently from adjusting the timing bands 560 for setting the eye relief distance.

Figure 24:
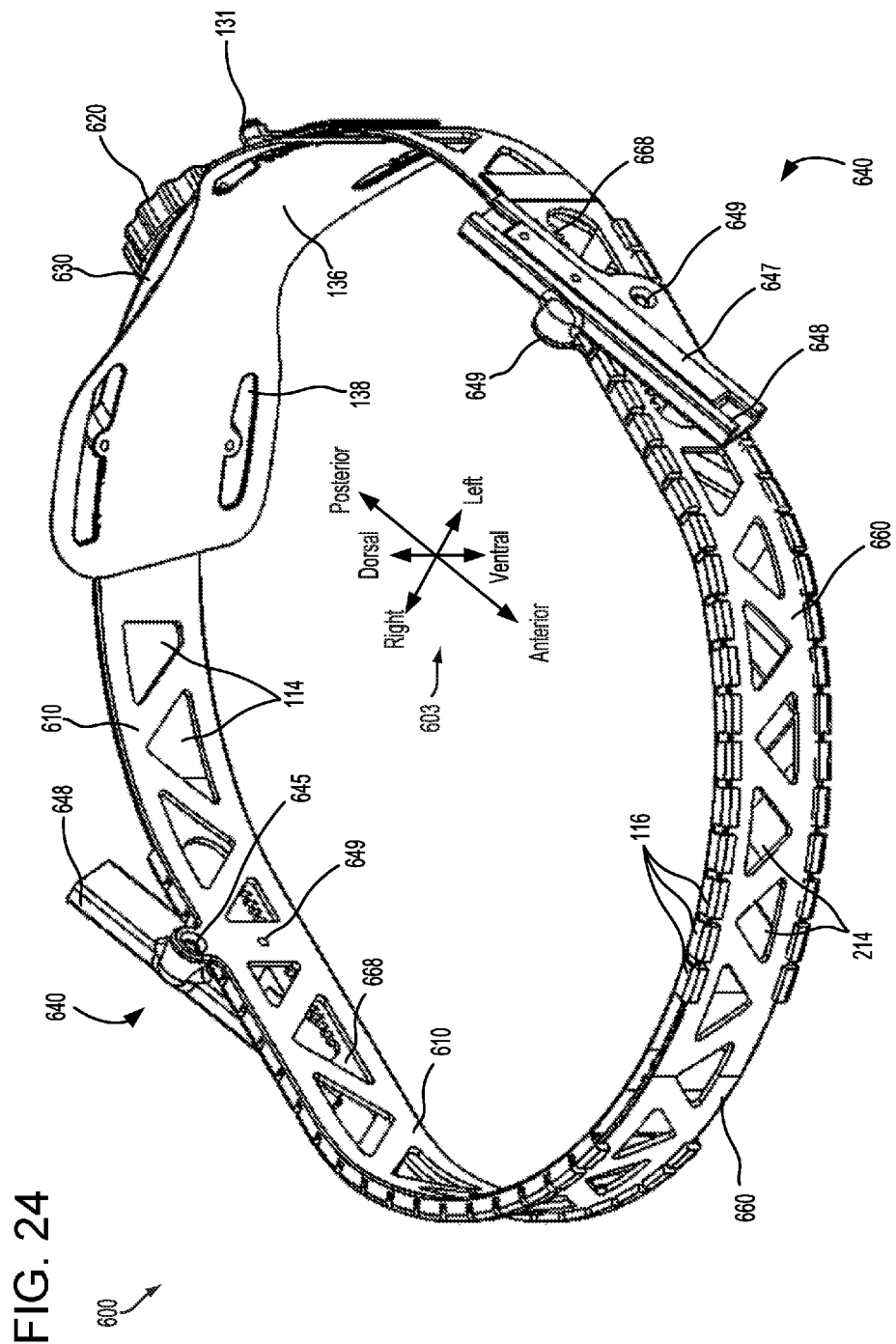
FIG. 24 is an anterior perspective view of an illustrative example of an HMD in accordance with a sixth embodiment of the present disclosure.
Figure 27:
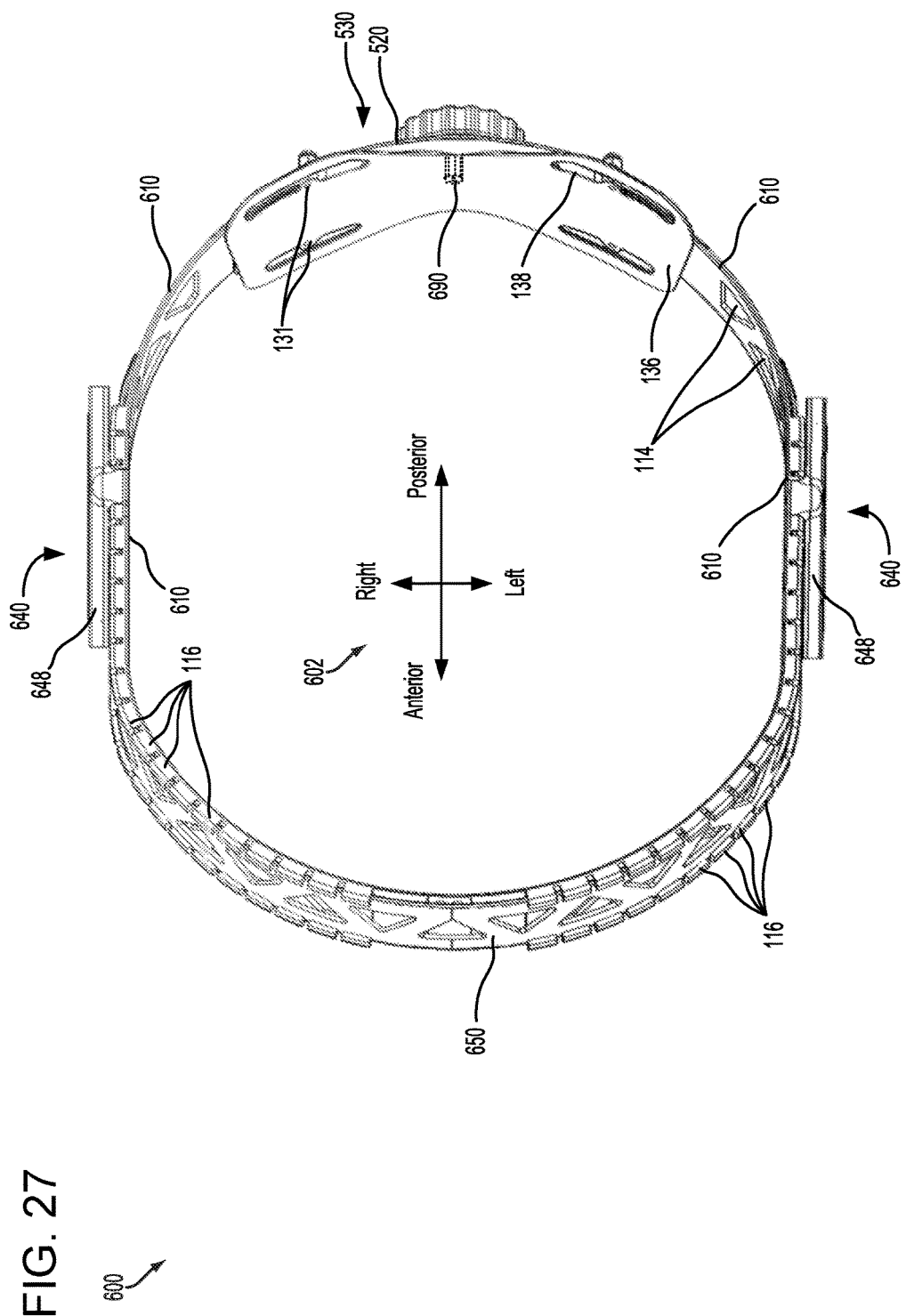
FIG. 27 is a perspective view of the HMD device of FIG. 24.
Figure 28:
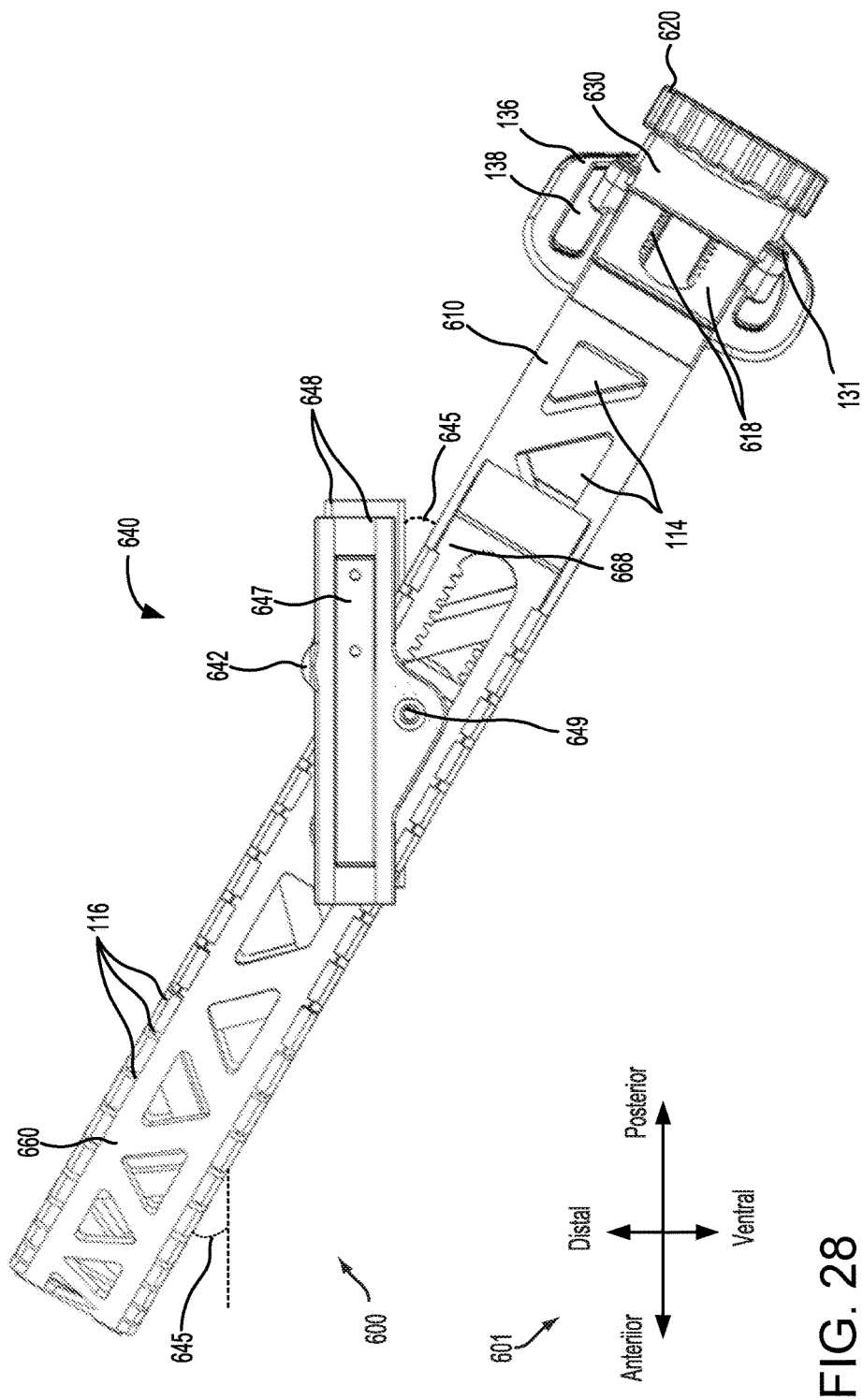
FIG. 28 is a side view of the HMD device of FIG. 24.

Turning now to FIGS. 24, 27, and 28, posterior perspective, plan, and side views respectively of a sixth embodiment of an HMD device 600 are illustrated. An HMD may include HMD device 600 to be worn by a user, the HMD device 600 comprising a flexible adjustable crown band 610. The circumference of the adjustable crown band 610 may be adjusted by a crown band circumference adjusting mechanism coupled to the adjustable crown band 610, the crown band circumference adjusting mechanism configured to adjust a circumference of the crown band to releasably secure the crown band to the crown of the user. In the example embodiment shown in FIGS. 24-28, the crown band circumference adjusting mechanism comprises the adjustable crown band 610, knob 620, housing 630, and crown racks 618. By rotating the knob 620 in a first or second direction, the crown racks 618 may be driven to either increase or decrease the circumference of the adjustable crown band 610, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 600 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 24-28, the eye relief distance adjustment mechanism comprise adjustable crown band 610, timing band 660, knob 620, housing 630, side racks 668, attachment structures 640, and sliding structures 116. By rotating the knob 620 in a first or second direction, side racks 668 may be driven to move the attachment structures 640 (along with the armature 3750 and display assembly 3790) in a timed manner anteriorly or posteriorly, respectively, along the distal surface of the adjustable crown band 610 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

As illustrated in FIGS. 24, 27, and 28, axes 601, 602, and 603 illustrate anterior, posterior, dorsal, ventral, left, and right directions. When HMD device 600 is worn by a user, flexible adjustable crown band 610 wraps around the user's crown at an angle 645 raised from the anterior-posterior axis. In one example angle 645 may be less than 35°, but greater than 10°. In particular, angle 645 may comprise approximately 30°. If angle 645 is greater than 35°, achieving a comfortable crown fit of HMD device 600 may be reduced. In this way, the HMD may be worn higher on a user's head, while maintaining an adjustment of the eye relief distance substantially in an anterior-posterior direction. At the posterior side of HMD device 600, ends of adjustable crown band 610 pass through and overlap inside housing 630. Adjustable crown band 610 may comprise crown racks 618 mounted to the ends of the adjustable crown band 610. Thus, the crown racks 618 may pass through and overlap inside housing 630, and may be engaged to a pinion 690 mounted at housing 630. Pinion 690 may be rotatably coupled to knob 620 such that when knob 620 is rotated in a first or second direction, lengths of the crown racks 618 passing through and overlapping inside housing 630 increase or decrease, respectively, thereby decreasing or increasing a crown circumference, respectively.

Timing band 660 may wrap around a distal (outer) surface of the anterior side of adjustable crown band 610. Anterior ends of the timing band 660 include side racks 668 at left and right sides of the HMD device 500. Side racks 668 may be engaged to attachment structures 640 positioned at left and right sides of HMD device 600. Turning now to FIGS. 25-26, partial side views of HMD device 600 are illustrated. In particular, FIG. 26 shows the partial side view of HMD device 600 of FIG. 25 with eye relief rack holder 648 removed to clearly show an exposed side view of the eye relief rack 647. As shown in FIGS. 25-26, attachment structures 640 may comprise side pinions 649, eye relief racks 547, eye relief rack holders 648, and fasteners 642. Accordingly side racks 668 may be engaged to side pinions 649 of attachment structures 640. Furthermore, applying a pushing force to display assembly 3790 towards the user's eyes or applying a pulling force to display assembly 3790 away from the user's eyes may drive side racks 668 to translate posteriorly or anteriorly (at an angle 645) along the crown band 610 respectively in a timed manner (e.g., in the same direction at the same time), which in turn may drive side pinions to rotate in a timed manner such that eye relief racks 647 translate posteriorly or anteriorly in the timed manner, respectively. Furthermore, side pinions may rotate in a first direction in a timed manner when eye relief racks 647 are translated posteriorly, and side pinions may rotate in a second direction in a timed manner when eye relief racks 647 are translated anteriorly. As described previously, sliding structures 116 may retain timing band 660 adjacent to the distal (outer) surface of adjustable crown band 610 and may maintain translation of timing band 660 in a substantially linear direction aligned with adjustable crown band 610. Further still, left and right arms 3752, 3754 of armature 3750 may be mounted to attachment structures 640 at eye relief racks 647. In this way, rotating knob 620 may adjust (e.g., decrease or increase) an eye relief distance 3792 between the users eyes 3794 and the display assembly 3790 in the timed manner relative to the left and right sides. Furthermore, because eye relief rack holders 648 are angled from adjustable crown band 610 at angle 645, eye relief racks 647 slide and translate at an angle 645 to the adjustable crown band 610, and adjustment eye relief distance may thus be maintained in a direction substantially aligned with the anterior-posterior axis even though the adjustable crown band 610 and the crown circumference adjustment are aligned with an axis at angle 645 to the anterior-posterior axis. Fasteners 642 may be configured to adjustably fix eye relief rack holders 648 to be positioned at angle 645 to the adjustable crown band. In some examples, fasteners 642 may be adjusted to adjust (increase and/or decrease) angle 645.

In a further example, a nested knob (analogous to nested knob assembly 320) may be provided in place of knob 620 for adjusting the crown circumference independently from adjusting the timing bands 560 for setting the eye relief distance. In another example, timing band 660 may be routed distally over a user's crown from the left side to the right side between attachment structures 640, instead of wrapping around an anterior side of the adjustable crown band 610.

Figure 29:
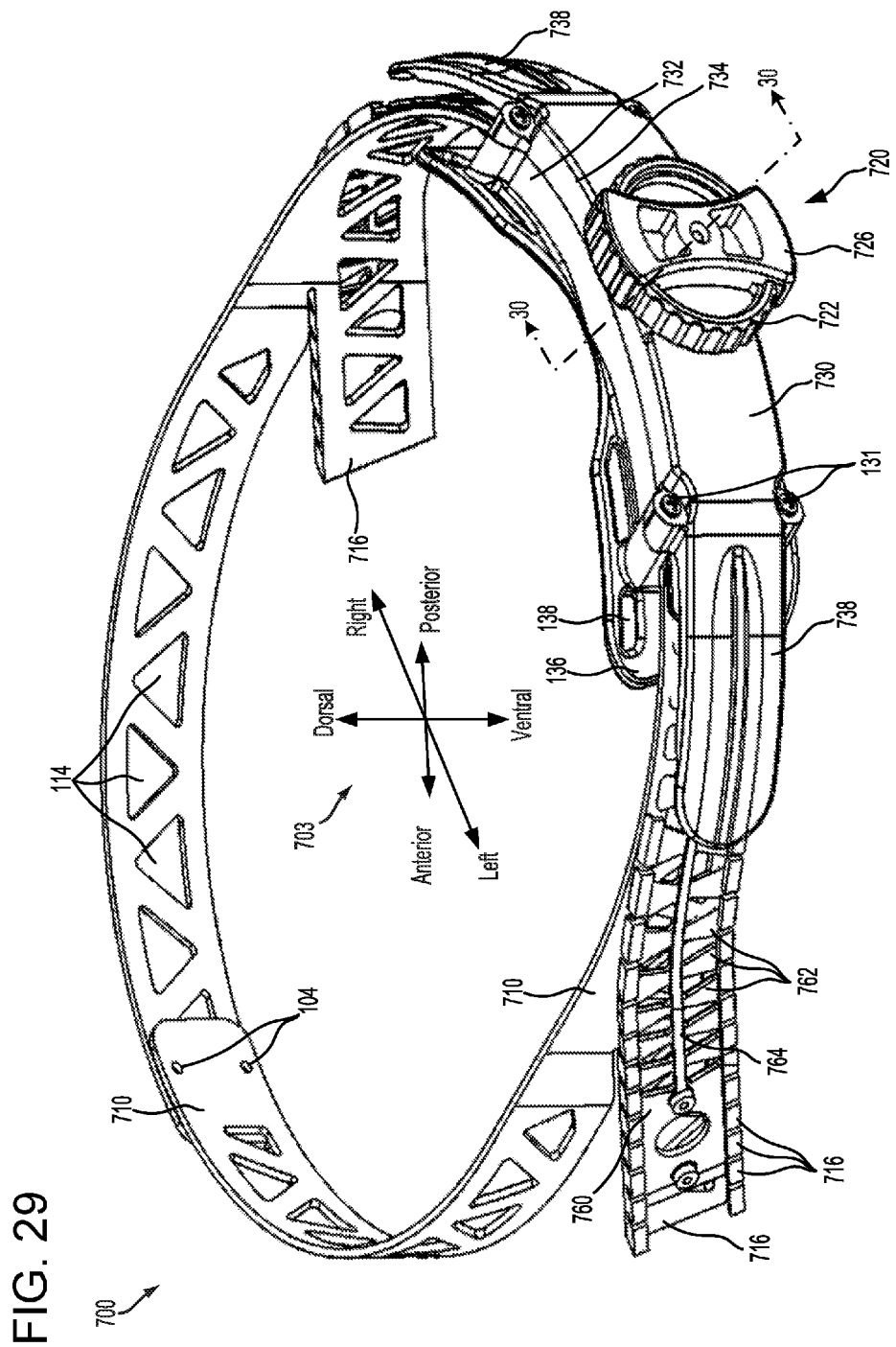
FIG. 29 is a posterior perspective view of an illustrative example of an HMD device in accordance with a seventh embodiment of the present disclosure.
Figure 30:
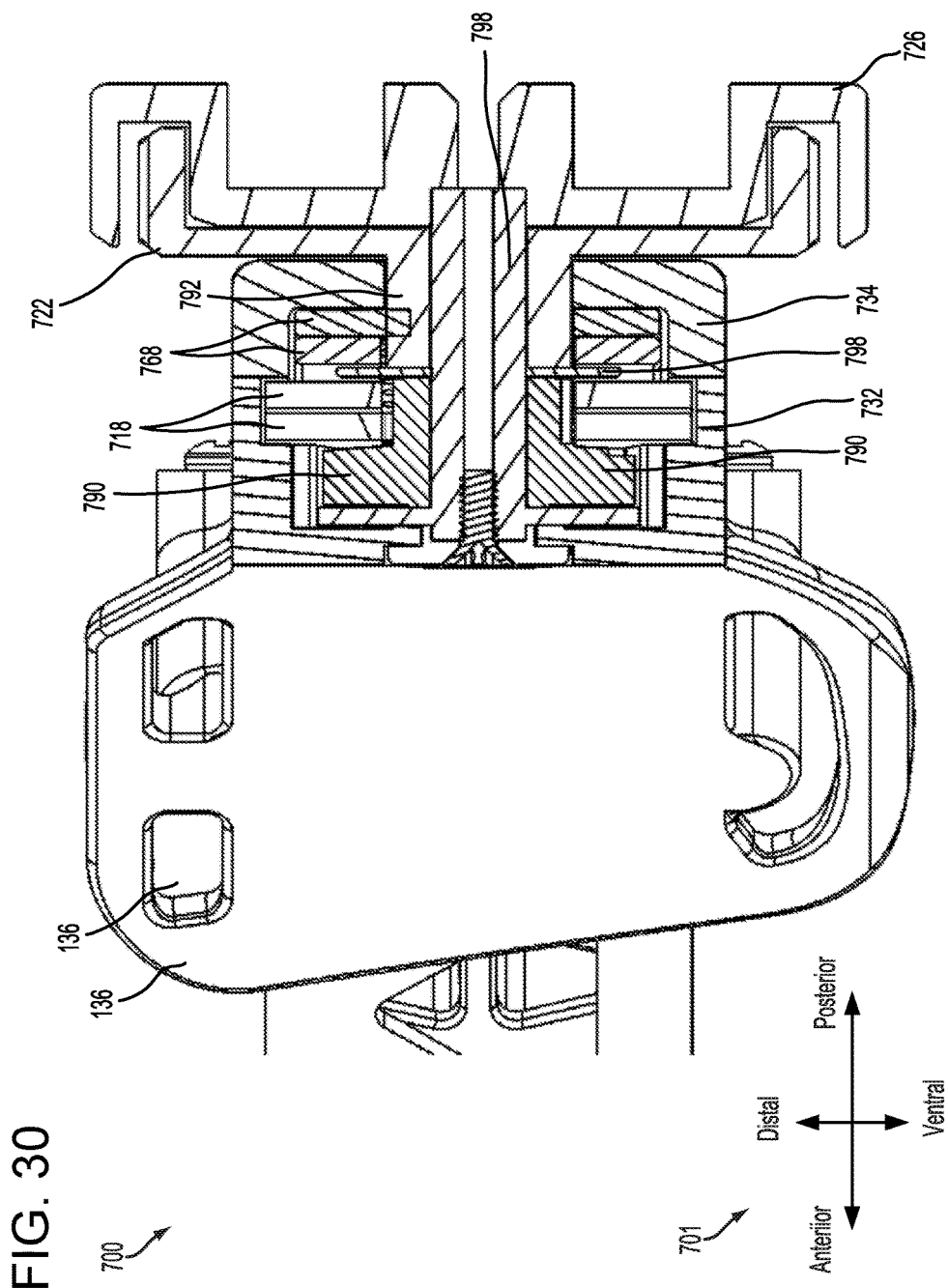
FIG. 30 is a cross-sectional view of the HMD device of FIG. 29 taken at section 30-30.
Figure 31:
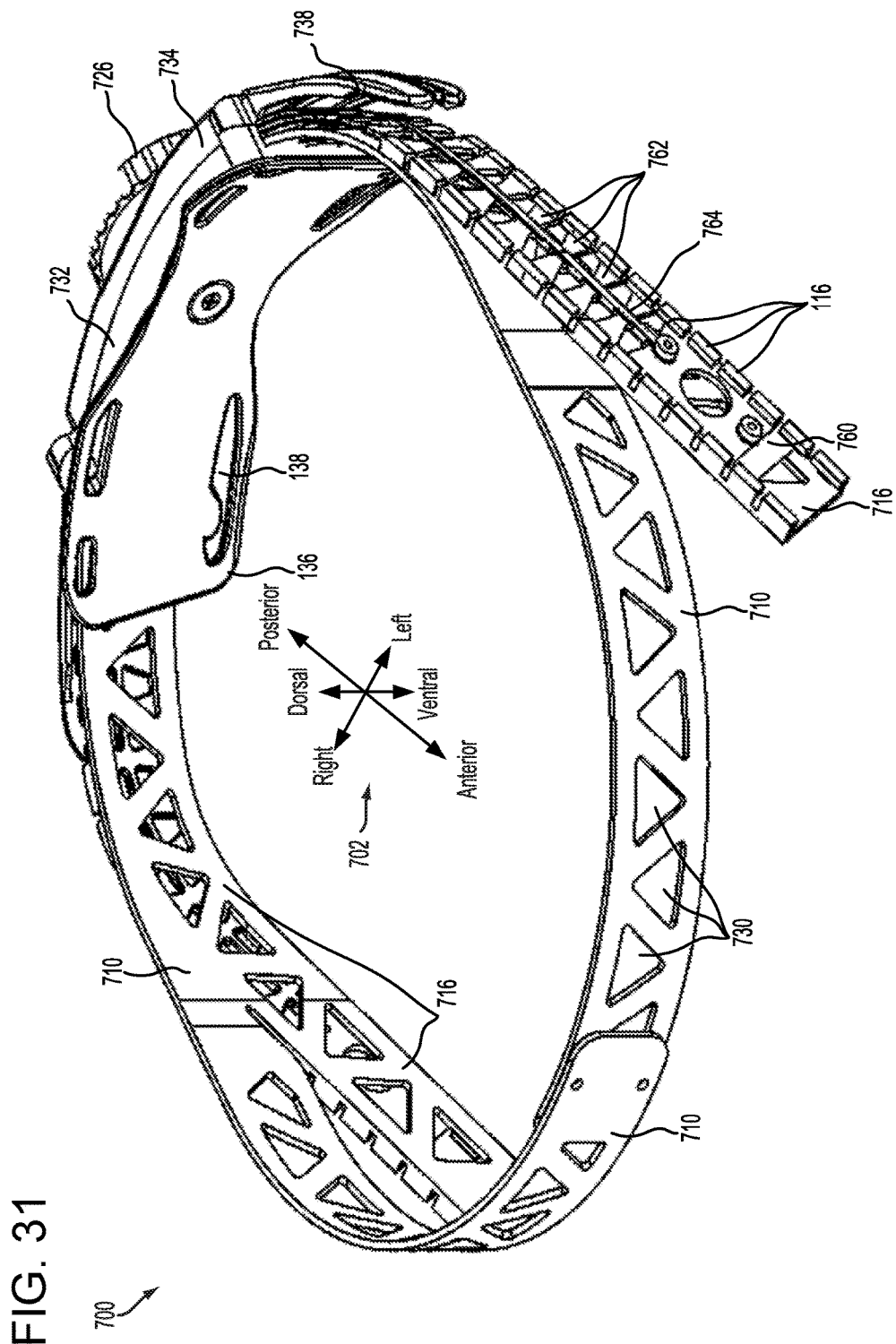
FIG. 31 is an anterior perspective view of the HMD device of FIG. 29.

Turning now to FIGS. 29 and 31, posterior perspective and anterior perspective views respectively of a seventh embodiment of an HMD device 700 are illustrated. An HMD may include HMD device 700 to be worn by a user, the HMD device 700 comprising a flexible adjustable crown band 710. The circumference of the adjustable crown band 710 may be adjusted by a crown band circumference adjusting mechanism coupled to the adjustable crown band 710, the crown band circumference adjusting mechanism configured to adjust a circumference of the crown band to releasably secure the crown band to the crown of the user. In the example embodiment shown in FIGS. 29-33, the crown band circumference adjusting mechanism comprises the adjustable crown band 710, knob assembly 720, housing 730, and crown racks 718. By rotating the outer knob 726 of knob assembly 720 in a first or second direction, the crown racks 718 may be driven to either increase or decrease the circumference of the adjustable crown band 710, respectively. In this way, the crown band circumference adjusting mechanism may facilitate user adjustment of the HMD and thereby reduce a risk of the HMD being too tight and causing discomfort, or too loose and moving relative to the user's head during use, and negatively impacting the user's experience.

The HMD device 700 of the HMD may further comprise an eye relief distance adjustment mechanism configured to move the left and right arms 3752, 3754 in a timed manner toward and away from the crown band along a substantially linear path, to thereby adjust an eye relief distance 3792 from the display assembly 3790 to an eye 3794 of a user when the crown band is fitted on the crown of the user. In the example embodiment of FIGS. 29-33, the eye relief distance adjustment mechanism comprise adjustable crown band 710, flexible eye relief bands 760, knob assembly 720, housing 730, eye relief racks 768, attachment structures 740, and sliding structures 116. By rotating the inner knob 722 of knob assembly 720 in a first or second direction, eye relief racks 768 may be driven to move the attachment structures 740 (along with the armature 3750 and display assembly 3790) in a timed manner anteriorly or posteriorly, respectively, along the distal surface of the adjustable crown band 710 to increase or decrease an eye relief distance 3792, respectively. In this way, the eye relief distance adjustment mechanism may facilitate adjusting eye relief distance of the HMD to increase a user's ability to properly perceive the augmented reality elements displayed on the display of the HMD, while achieving a comfortable fit to the user's head size via the crown band circumference adjustment mechanism.

As illustrated in FIGS. 29-31, axes 701, 702, and 703 illustrate anterior, posterior, dorsal, ventral, left, and right directions. A flexible adjustable crown band 710 wraps around a user's crown when the HMD device 700 is worn. Ends of the adjustable crown band 710 may comprise crown racks 718 overlapping inside and passing through a housing 730 at a posterior side of HMD device 700. Crown racks 718 may be engaged to a crown rack pinion 790 mounted to housing 730 and rotatably coupled to outer knob 726 of knob assembly 720. Rotating outer knob 726 in a first direction or second direction may drive crown drive 794, which in turn drives crown rack pinion 790 thereby increasing or decreasing a length of crown racks 718 overlapping inside and passing through housing 730, and thereby decreasing or increasing a crown circumference. The crown racks move in a timed manner, moving at the same time, at the same rate, and in the same direction (towards or away from crown rack pinion 790) because both crown racks 718 are engaged to crown rack pinion 790.

Flexible eye relief bands 760 wrap around a posterior of the HMD device 700 adjacent to a distal (outer) surface of adjustable crown band 710. Posterior ends of the eye relief bands 760 pass through and overlap inside housing where they are engaged to an eye relief rack pinion 792. Eye relief rack pinion 792 may be rotatably coupled to inner knob 722 and may be coaxial with crown rack pinion 790. Housing 730 may comprise an inner housing 732 and an outer housing 734 separated by spacer 798. Crown racks 718 overlap inside and pass through inner housing 732, and eye relief racks 768 overlap inside and pass through outer housing 734. Accordingly, interference between the crown racks 718 and the eye relief racks 768 inside housing 730 is reduced, and operation of HMD device 700 is enhanced. Rotating inner knob 722 in a first or second direction drives eye relief rack pinion 792 and may increase or decrease a length of the eye relief racks 768 passing through and overlapping inside outer housing 734. The eye relief racks 768 move, translating in a timed manner, moving at the same time, at the same rate, and in the same direction (towards or away from eye relief rack pinion 792) because both eye relief racks 768 are engaged to eye relief rack pinion 792.

Posterior portions 763 of eye relief bands 760 may be substantially linear, and may comprise eye relief rack 768. An anterior portion 761 of eye relief bands 760 may be two-dimensionally flexible, capable of bending or flexing in distal-ventral direction and in the left-right direction. Anterior portion 761 may comprise a fishbone-like structure, including a flexible spine 764 and plate-like arms 762 extending perpendicularly from distal and ventral sides of the spine 764. Arms 762 may increase in dimension with increasing distance from flexible spine 764 to impart increased flexibility to anterior portion 761. Rotating inner knob 722 moves posterior ends of the eye relief bands 760, including the eye relief racks 768 in a substantially linear manner, aligned with the adjustable crown band 710. Furthermore, housing guides 738 extending from left and right sides of housing 730 may guide posterior portions 763 the eye relief bands 760 as they are driven upon rotation of inner knob 722.

Anterior portion 761 of the eye relief bands 760 may be bent ventrally from alignment with adjustable crown band 710 at angle 745 to be substantially aligned with a posterior-anterior axis. In this way, anterior portions 761 may be guided along beams 716 extending anteriorly from crown band 710 on the left and right sides, and angled ventrally from alignment with adjustable crown band 710 at angle 745 to be substantially aligned with a posterior-anterior axis. Beams 716 may also bend in a left-right axis and are thus enables HMD device 700 to be capable of fitting a range of user crown widths. Beams 716 may comprise sliding structures 116 which may serve to retain anterior portions 761 such that eye relief bands 760 slide adjacent to a distal (outer) surface of the beams 716 when eye relief distance of the HMD device 700 is adjusted. As shown in FIGS. 32-33, anterior ends of eye relief bands 760 may comprise attachment structures 740. Attachment structures 740 may comprise fixtures 744 and opening 746 for mounting proximal ends of left and right arms 3752, 3754 of armature 3750 to which display assembly 3790 is mounted. As described above with reference to attachment structures 740, attachment structures 740 may comprise rivets, screws, bolts, hooks, openings, and other structures suitable for mechanical coupling. In this way, rotation of inner knob 722 in a first or second direction may adjust an eye relief distance between display assembly 3790 and the eyes 3794 of the user in a substantially linear manner aligned with an anterior-posterior axis. Furthermore, because left and right eye relief bands 760 are engaged to eye relief rack pinion 792, movement of the left and right arms 752, 754 may be in a timed manner, wherein the left and right arms 752, 754 move at the same time, in the same direction, and at the same rate.

As both the crown racks 718 and the eye relief racks 768 are grounded at the posterior of HMD device 700 via crown rack pinion 790 and eye relief rack pinion 792, respectively, adjustment of the eye relief distance may comprise accounting for changes to the eye relief distance resulting from adjustments to crown circumference.

As described above with reference to knob assembly 320, knob assembly 720 may be a non-backdrivable mechanism. As such, adjustment of the crown circumference and the eye relief distance may not be performed without rotation of the outer knob 726 and the inner knob 722, respectively. The non-backdrivable nature of HMD device 700 may be advantageous because a particular eye relief distance and a particular crown fit (e.g., crown circumference) of the HMD device 700 may be maintained between multiple doffs and dons of the HMD. As such a user may use the HMD, remove the HMD while performing other activities, and then return to use the HMD again, without fear of the HMD fit or eye relief distance having changed. The non-backdrivable nature of HMD device 700 thus increases a user-friendliness of the HMD, and may reduce a user setup time associated with the HMD.

In another embodiment of HMD device 700, eye relief distance may be adjusted by applying a pushing force to the display assembly 3790 towards the user's eyes, or by applying a pulling force to the display assembly 3790 away from the user's eyes to overcome friction, as described analogously for HMD devices 200 and 300. In such an embodiment, HMD device 700 may comprise a single knob (similar to HMD devices 200, 300), rather than a nested knob assembly 720.

Figure 34:
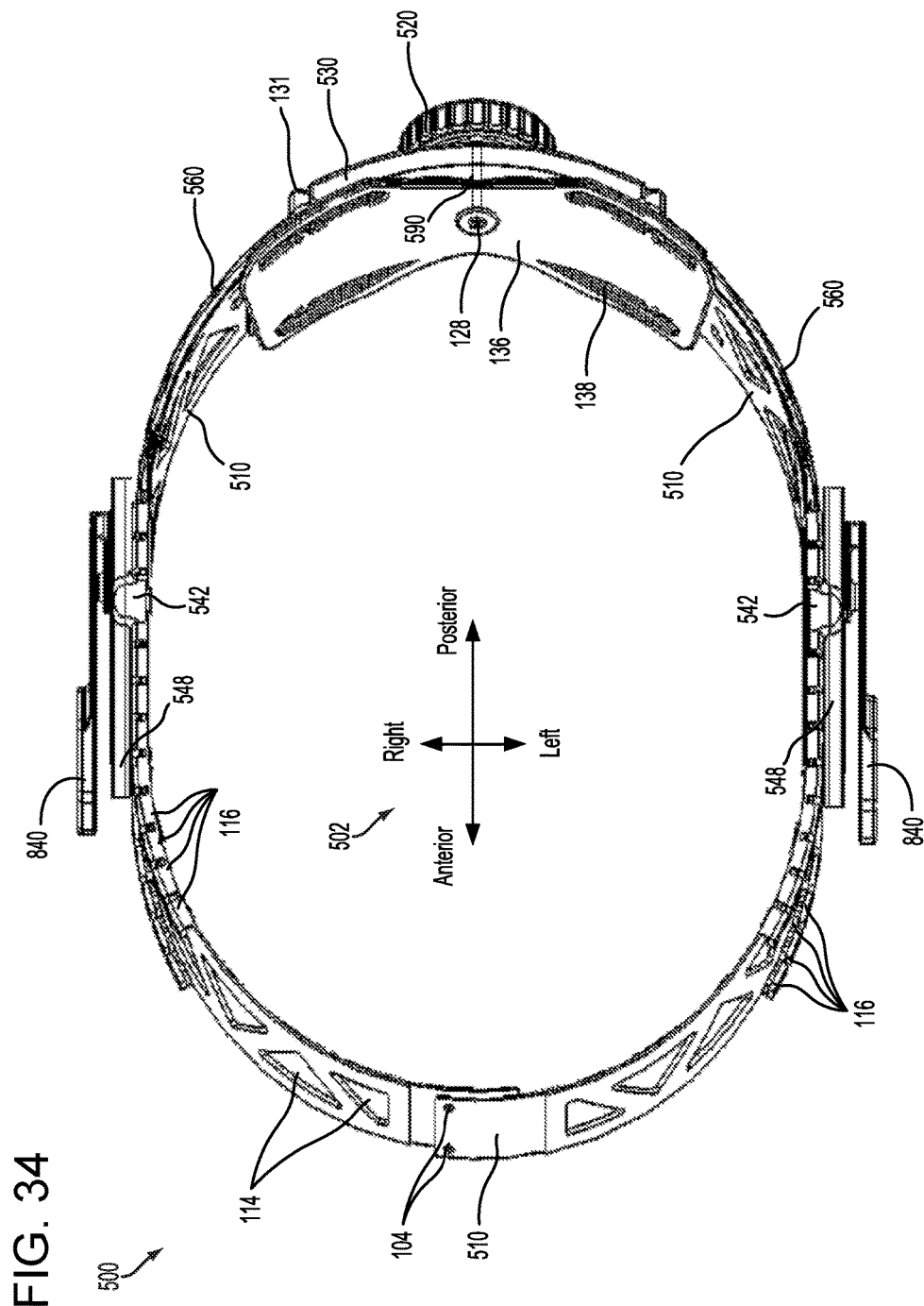
FIG. 34 is a perspective view of an illustrative example of an HMD device in accordance with an eighth embodiment.

Turning now to FIGS. 34-36, plan, perspective side, and side views are illustrated of an example of HMD device 500 comprising another type of attachment structure 840 in place of attachment structure 540. Attachment structure 840 is shown integrated with HMD device 500 at left and right sides in place of attachment structure 540, however, attachment structure 840 may also be integrated with other embodiments. Attachment structure 840 may comprise a flexible base 848 mounted via fastener 849 (e.g. screw, bolt, rivet, and the like) to eye relief rack holder 548. Fastener 849 may also be coupled to an end of side pinion 549. At an anterior end of the flexible base 848, a mounting protrusion 845 may be provided. The mounting protrusion 845 may comprise a particular geometry to enable mechanical coupling or mating with a complimentary socket of left and arms 3752, 3745 of armature 3750. Mounting protrusion 845 may comprise a flexible material such as a silicone rubber or polymer elastomer which can elastically deform when compressed. Mounting protrusion may also comprise one or more sockets 844, 846 corresponding to one or more protrusions in proximal ends of left and right arms 3750, 3752 for aiding in alignment of the attachment structure 840 to left and right arms of armature 3750 to facilitate mechanical coupling thereof. Since attachment structure 840, in particular mounting protrusion 845 and flexible base 848, is flexible, the HMD device may be capable of accommodating various user crown widths. For example, in the case of wider user crowns, attachment structures 840 may elastically flex distally to provide a comfortable fit. In this way, an HMD device may accommodate wider user crowns, even though the armature 3790 may be relatively stiff and rigid in order to provide strength and support for display assembly 3790. Besides accommodating varying head widths, flexible attachment structure 840 also accounts for the changing distance between the crown band and the front housing assembly as the eye relief is adjusted and the front housing assembly attach point moves along the side curvature of a specific user's head. Furthermore, eye relief adjustment may be performed via timing bands 560, timing band racks 568, side racks 566, and pinions 592 in the timed manner, as described above with reference to the example embodiments.

Returning to FIG. 37, it illustrates an HMD 3700 comprising armature 3750 with display assembly 3790 mounted thereon. Axis 3702 illustrates posterior, anterior, left, right, dorsal, and ventral directions. Armature 3750 is mounted at left and right sides of the HMD device at attachment structures. As described above with reference to the example HMD device embodiments, attachment structures may comprise one or more of attachment structures 140, 540, 640, 740, and 840. HMD 3700 further comprises an HMD device including an eye relief rack housing 270 mounted to the adjustable crown band 210, left and right eye relief bands 250, 252 wrapped around adjacent to a distal surface of adjustable crown band 210 at an anterior side, and housing 230 mounted to adjustable crown band at a posterior side. In this way, HMD device of HMD 3700 may include several features of HMD device 200 including adjusting crown circumference via housing 230 by rotating a knob 220 rotatably coupled to a crown rack pinion 292 thereat, wherein the crown rack pinion 292 may be engaged to crown racks mounted to posterior ends of the adjustable crown band 210. Furthermore, adjusting an eye relief distance 3792 of HMD device of HMD 3700 may include applying a pushing force to display assembly 3790 toward or applying a pulling force to display assembly 3790 away from the user's crown to thereby rotate crown rack pinion 292 engaged to eye relief racks 280, 282. Further still, as shown in FIG. 37, HMD device of HMD 3700 may be worn at an angle 545 to the anterior-posterior axis. Furthermore, the attachment structures for attaching armature 3750 to the HMD device of HMD 3700 may be configured to rigidly support armature 3750 to maintain the angle 545 during use of the HMD (e.g., including wearing, and donning and doffing the HMD) and to flexibly support armature 3750 to accommodate various user crown widths (as in attachment structures 740 and/or 840. By positioning armature at an angle 545 to adjustable crown band 210, eye relief distance may be adjusted substantially linearly aligned with the posterior-anterior axis, even though the adjustable crown band may be worn at an angle 545 above the posterior-anterior axis.

Turning now to FIG. 38, it illustrates an example of a display assembly 3790 mounted to an armature 3750. Display assembly 3790 may be mounted at a central mounting position 3810 at an anterior side of armature 3750 (e.g., at a distal side of armature 3750 relative to a user's crown). At proximal surfaces of posterior ends of the armature 3750, coupling structures 3740 may include openings, cavities, and other structures complementary to attachment structures (e.g., one or more of attachment structures 140, 540, 640, 740, and 840) for coupling and attaching armature 3750 to the corresponding HMD device of an HMD. Armature 3750 may have an approximately semi-circular arced shape to provide strength and rigidity to the HMD, while conforming approximately to a shape of the user's crown, and to reduce a weight of the HMD. FIG. 39 illustrates an example of the armature 3750.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A head mounted display (HMD) to be worn by a user, comprising:
    an adjustable crown band;
    left and right crown racks at posterior ends of the crown band;
    a crown band circumference adjusting mechanism coupled to the crown band and configured to adjust a circumference of the crown band by moving the left and right crown racks in a timed manner;
    a display mounted at an anterior side of the crown band; and
    an eye relief distance adjustment mechanism configured to (1) move the display toward and away from the crown band along a substantially linear path, to thereby adjust an eye relief distance from the display to an eye of the user when the crown band is fitted on the crown of the user, and (2) adjust the eye relief distance while maintaining the circumference of the crown band.

2. The HMD of claim 1, wherein the crown band circumference adjusting mechanism comprises:
    a housing mounted at a posterior end of the HMD, the housing including a first knob and a first pinion rotatably coupled thereto;
    wherein the left and right crown racks pass through the housing and are engaged to the first pinion, and wherein rotating the first pinion via the first knob adjusts a length of the left and right crown racks passing through the housing to adjust the circumference of the crown band.

3. The HMD of claim 2, wherein the first knob and the first pinion are coaxial.

4. The HMD of claim 1, wherein the eye relief distance adjustment mechanism further comprises a sliding structure configured to enable the display to move toward and away from the crown band along the substantially linear path, when a pushing or pulling force is applied to the display by the user.

5. The HMD of claim 1, wherein the eye relief distance adjustment mechanism is non-backdrivable to prevent adjustment of the eye relief distance without actuation of the eye relief distance adjustment mechanism.

6. The HMD of claim 1, wherein the eye relief distance adjustment mechanism includes a linear motion actuator.

7. The HMD of claim 1, further comprising left and right bands extending along at least a portion of the crown band, the left and right bands including a flexible material that is configured to elastically deform.

8. The HMD of claim 1, wherein the crown band circumference adjusting mechanism is configured to adjust the circumference of the crown band by moving the left and right crown racks in the timed manner such that translation of the left and right crown racks is synchronized.

9. The HMD of claim 1, wherein the crown band circumference adjusting mechanism is configured to adjust the circumference of the crown band by moving the left and right crown racks in the timed manner such that the left and right crown racks translate at the same rate.

10. The HMD of claim 1, wherein the crown band circumference adjusting mechanism is further configured to adjust the circumference of the crown band by moving the left and right crown racks anteriorly or posteriorly.

11. The HMD of claim 1,
    wherein the crown band circumference adjusting mechanism comprises an inner housing and an outer housing both mounted at a posterior end of the HMD.

12. A head mounted display (HMD) to be worn by a user, comprising:
    an adjustable crown band;
    a crown band circumference adjusting mechanism coupled to the crown band and configured to adjust a circumference of the crown band in a timed manner to releasably secure the crown band to the crown of the user;
    an armature including a left arm and a right arm, each of the left arm and the right arm mounted at a respective proximal end to corresponding left and right attachment structures on the HMD;
    a display mounted at a central mounting position of the armature; and
    an eye relief distance adjustment mechanism configured to (1) move the display toward and away from the crown band along a substantially linear path, to thereby adjust an eye relief distance from the display to an eye of the user when the crown band is fitted on the crown of the user, and (2) adjust the eye relief distance while maintaining the circumference of the crown band.

13. The HMD of claim 12, wherein the crown band and the armature occupy an anterior side of the HMD.

14. The HMD of claim 12, wherein the left and right attachment structures each comprise at least one mounting hole.

15. The HMD of claim 12, wherein actuation of the crown band circumference adjusting mechanism moves the armature anteriorly or posteriorly relative to the crown band.

16. The HMD of claim 12, wherein the crown band circumference adjusting mechanism comprises:
   a housing mounted at a posterior end of the HMD, the housing including a first knob and a first pinion rotatably coupled thereto; and
   left and right crown racks mounted at posterior ends of the crown band, the left and right crown racks passing through the housing and engaged to the first pinion, wherein rotating the first pinion via the first knob adjusts a length of the left and right crown racks passing through the housing to adjust the circumference of the crown band.

17. The HMD of claim 12, wherein the eye relief distance adjustment mechanism further comprises a sliding structure configured to enable the display to move toward and away from the crown band along the substantially linear path, when a pushing or pulling force is applied to the display by the user.

18. The HMD of claim 12, further comprising left and right bands extending along at least a portion of the crown band, the left and right bands including a flexible material that is configured to elastically deform.

19. A head mounted display (HMD) to be worn by a user, comprising:
   an adjustable crown band;
   a crown band circumference adjusting mechanism coupled to the crown band and configured to adjust a circumference of the crown band in a timed manner to releasably secure the crown band to the crown of the user, the crown band circumference adjusting mechanism comprising:
      a housing mounted at a posterior end of the HMD, the housing including a first knob and a first pinion rotatably coupled thereto; and
      left and right crown racks at posterior ends of the crown band, the left and right crown racks passing through the housing and engaged to the first pinion, wherein rotating the first pinion via the first knob adjusts a length of the left and right crown racks passing through the housing to adjust the circumference of the crown band;
   an armature including a left arm and a right arm, each of the left arm and the right arm mounted at a respective proximal end to corresponding left and right attachment structures on the HMD;
   a display mounted at a central mounting position of the armature; and
   an eye relief distance adjustment mechanism configured to (1) move the display toward and away from the crown band along a substantially linear path, to thereby adjust an eye relief distance from the display to an eye of the user when the crown band is fitted on the crown of the user, and (2) adjust the eye relief distance while maintaining the circumference of the crown band.

20. The HMD of claim 1, wherein the eye relief distance adjustment mechanism is configured to move the display toward and away from the anterior side of the crown band.

* * * * *